(12) United States Patent
Takashima et al.

(10) Patent No.: US 8,493,334 B2
(45) Date of Patent: Jul. 23, 2013

(54) INPUT DEVICE, STORAGE MEDIUM, INFORMATION INPUT METHOD, AND ELECTRONIC APPARATUS

(75) Inventors: Kouichiro Takashima, Tokyo (JP); Tsutomu Takahashi, Kanagawa (JP); Satoshi Kushima, Tokyo (JP); Hideki Okii, Tokyo (JP); Shun Kayama, Saitama (JP); Yukiko Shimizu, Saitama (JP); Takashi Sawada, Kanagawa (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 784 days.

(21) Appl. No.: 12/171,920

(22) Filed: Jul. 11, 2008

(65) Prior Publication Data

US 2009/0015555 A1    Jan. 15, 2009

(30) Foreign Application Priority Data

Jul. 12, 2007   (JP) .................................. 2007-183596

(51) Int. Cl.
*G06F 3/041* (2006.01)

(52) U.S. Cl.
USPC ........................................................ 345/173

(58) Field of Classification Search
USPC .................. 345/158, 173–175; 715/810, 835, 715/840; 178/18.01, 18.06
See application file for complete search history.

(56) References Cited

U.S. PATENT DOCUMENTS 6,259,436 B1 * 7/2001 Moon et al. .................... 345/173
7,292,227 B2 * 11/2007 Fukumoto et al. ............ 345/173

| | | | |
|---|---|---|---|
| 2002/0104955 A1 | 8/2002 | Koops et al. | |
| 2002/0136455 A1 | 9/2002 | Lin et al. | |
| 2006/0161870 A1 * | 7/2006 | Hotelling et al. | 715/863 |
| 2007/0028186 A1 * | 2/2007 | Park et al. | 715/810 |
| 2007/0216637 A1 * | 9/2007 | Ito | 345/102 |
| 2008/0278450 A1 | 11/2008 | Lashina | |

FOREIGN PATENT DOCUMENTS

| | | |
|---|---|---|
| JP | 2001-502078 | 2/2001 |
| JP | 2003-330618 | 11/2003 |
| JP | 2004-318819 | 11/2004 |
| JP | 2004-535610 | 11/2004 |
| JP | 2006-172106 | 6/2006 |
| JP | 2006-243927 | 9/2006 |

(Continued)

OTHER PUBLICATIONS

JP Office Action for corresponding Japanese Patent Application 2007-183596 dated Jul. 26, 2011.

(Continued)

*Primary Examiner* — Chanh Nguyen
*Assistant Examiner* — Tsegaye Seyoum
(74) *Attorney, Agent, or Firm* — K&L Gates LLP

(57) ABSTRACT

An optical input device has a display screen, a portion of the display screen being shielded from light by an operating member to implement input processing based on a plurality of input modes. The input device includes an input detection unit including a display unit that displays predetermined input information, and a control unit. The input detection unit detects an area and/or brightness of a light-shielded portion formed on the display screen by the operating member by approaching the display unit. The control unit provides display control of the display unit and input control on the basis of the detected area and/or brightness. The control unit compares the detected area and/or brightness with a predetermined threshold value to select a desired input mode from among the plurality of input modes.

11 Claims, 18 Drawing Sheets

| FOREIGN PATENT DOCUMENTS | | | | | |
|---|---|---|---|---|---|
| JP | 2006-244446 | 9/2006 | JP | 2007-052497 | 3/2007 |
| JP | 2006238053 | 9/2006 | JP | 2008-505381 | 2/2008 |
| JP | 2006-276223 | 10/2006 | | | |

* cited by examiner

FIG. 3D

| INPUT STAGE | SOUND | TACTILE SENSATION |
|---|---|---|
| STARTUP | NO | NO |

FIG. 4A
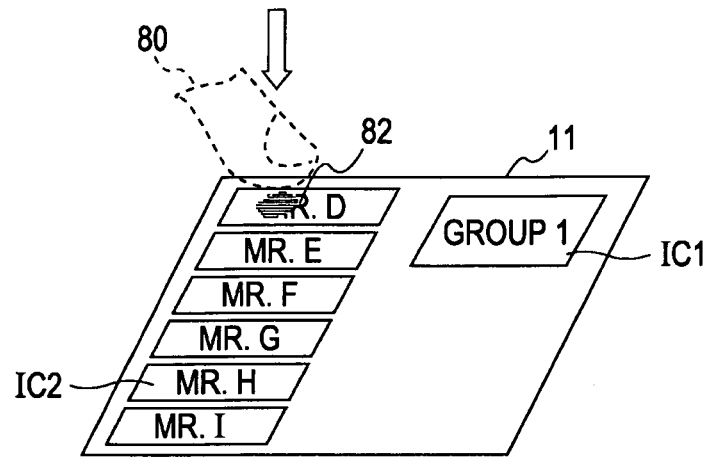
FIG. 4B
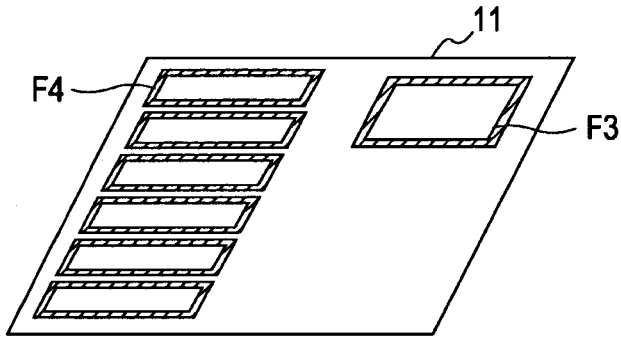
FIG. 4C
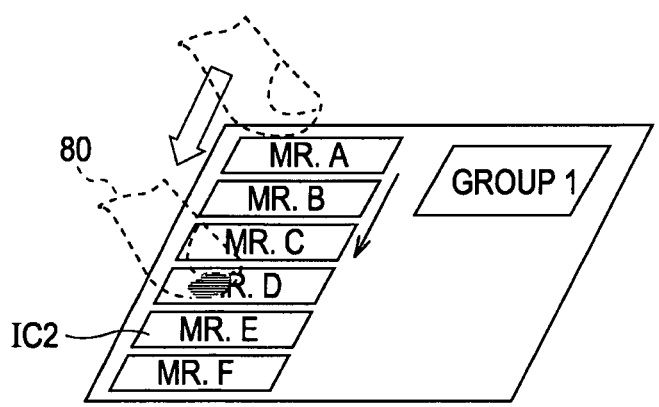
FIG. 4D
| INPUT STAGE | SOUND | TACTILE SENSATION |
|---|---|---|
| SCROLLING | YES (E.G., BEEP) | YES (SHAPE RECOGNITION) |

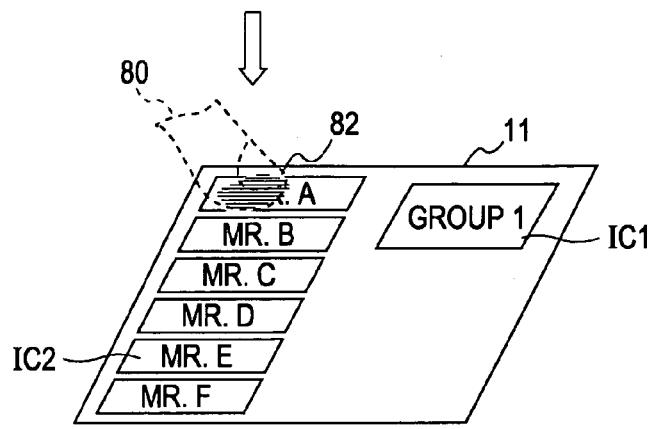
FIG. 5A
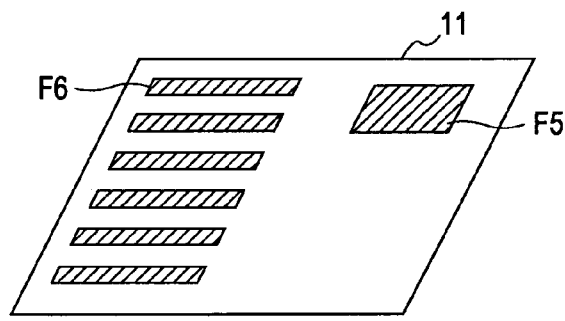
FIG. 5B
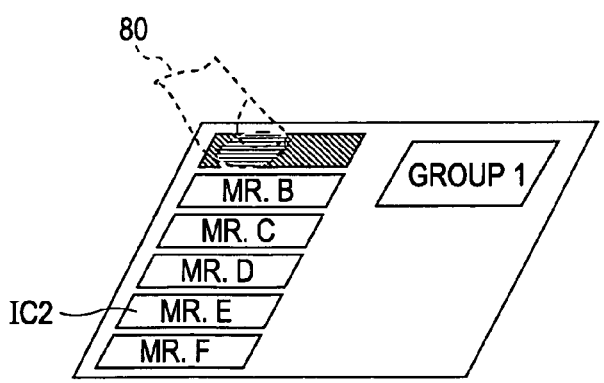
FIG. 5C
FIG. 5D
| INPUT STAGE | SOUND | TACTILE SENSATION |
|---|---|---|
| DETERMINATION | YES (E.G., WARNING BEEP) | YES (CLICK FEELING) |

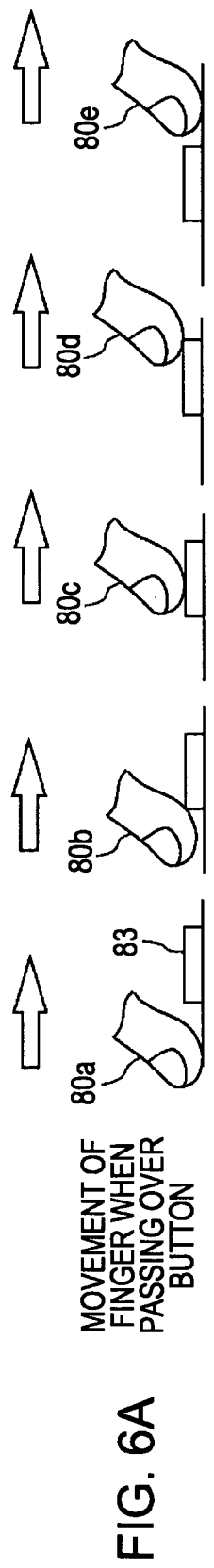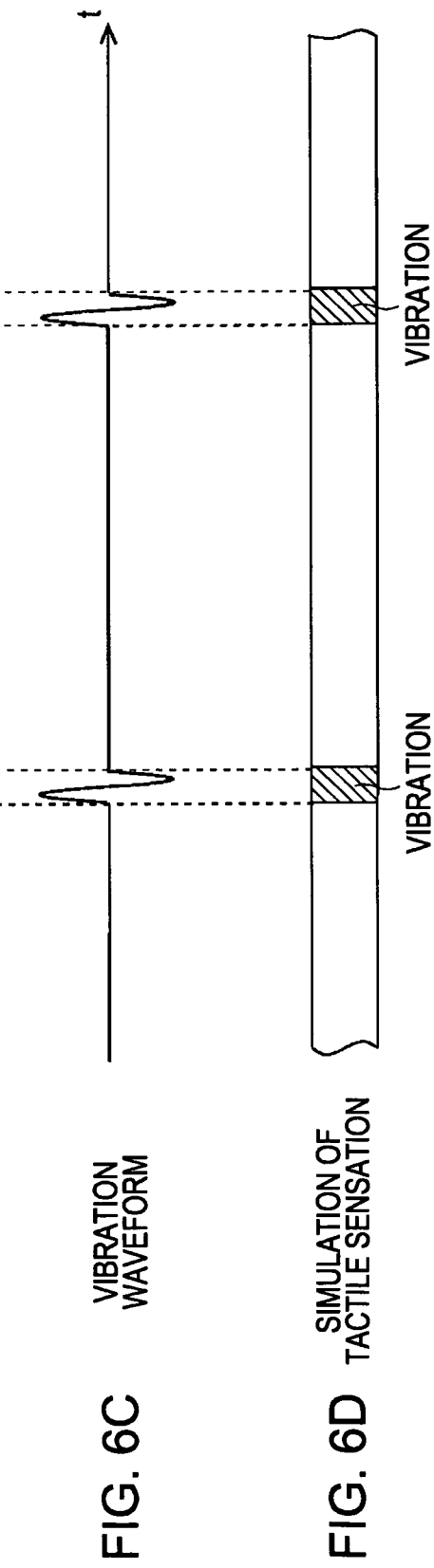

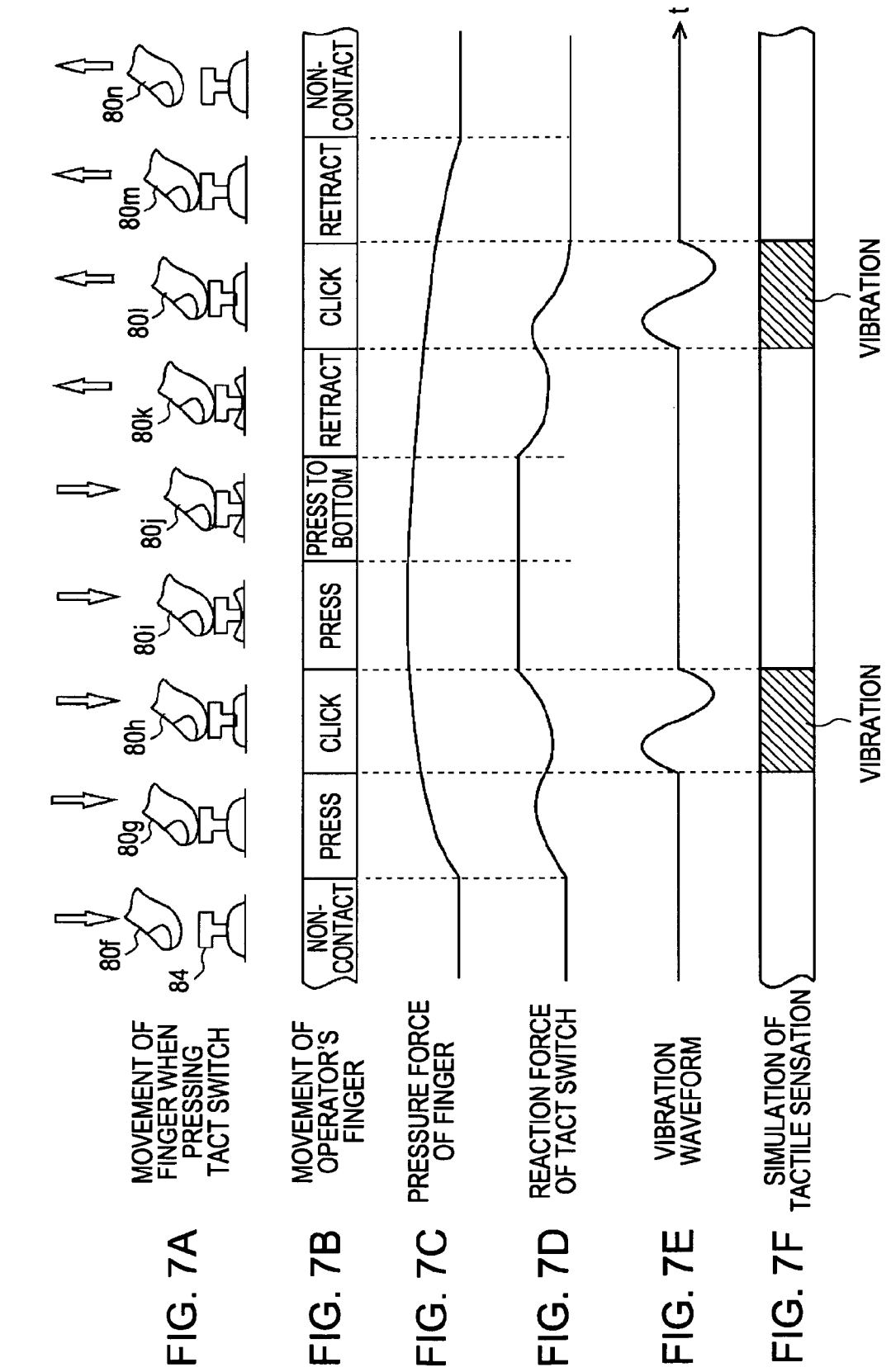

FIG. 8

|  | SELECTION CONDITION | SELECTED INPUT MODE |
|---|---|---|
| DETERMINATION 1 | $D11 \leq X < D12$ | INPUT MODE I |
| DETERMINATION 2 | $D12 \leq X < D13$ | INPUT MODE II |
| DETERMINATION 3 | $D13 \leq X$ | INPUT MODE III |

DIFFERENCE BRIGHTNESS: $X = |Xn - Xave|$

FIG. 10

|  | SELECTION CONDITION | SELECTED INPUT MODE |
|---|---|---|
| DETERMINATION 1 | D21 < N×1 | INPUT MODE I |
| DETERMINATION 2 | D21 < N×1 AND N×2 < D22 | INPUT MODE II |
| DETERMINATION 3 | D21 < N×1 AND D22 ≤ N×2 | INPUT MODE III |

PRIOR ART $X_{th} < X = |X_n - X_{ave}|$

PRIOR ART

PRIOR ART

INPUT DEVICE, STORAGE MEDIUM, INFORMATION INPUT METHOD, AND ELECTRONIC APPARATUS

CROSS REFERENCE TO RELATED APPLICATIONS

The present application claims priority to Japanese Patent Application JP 2007-183596 filed in the Japanese Patent Office on Jul. 12, 2007, the entire contents of which are incorporated herein by reference.

BACKGROUND

The present application relates to an input device suitable for a mobile phone, a digital camera, an information processing apparatus, or the like having a display screen which is touched to enter information, a storage medium, an information input method, and an electronic apparatus. More specifically, the present invention relates to an input device including a controller which provides display and input control, in which the area and/or brightness of a light-shielded portion of the display screen that is formed by an operating member is detected and the detected area and/or brightness is compared with a predetermined threshold value to select a desired input mode from among a plurality of input modes to implement input processing for each stage of operation according to a pressing state of the operating member, resulting in an improvement in operability.

Recently, users or operators have loaded various kinds of content into portable terminal apparatuses such as mobile phones and personal digital assistants (PDA) for use. Such portable terminal apparatuses are provided with an input device. The input device generally includes an input unit such as a keyboard or a JOG dial, and a display unit such as a touch panel.

Recently, optical touch panels employing liquid crystal panel technology have been available as touch panels suitable for input devices. An optical touch panel includes, on a liquid crystal display surface thereof, a light-shielding detection surface having a plurality of optical sensors (photosensors), and input information is obtained from a light-shielded portion formed by a user's finger.

A planar display device using this type of optical touch panel and an image obtaining method therefore are disclosed in Japanese Unexamined Patent Application Publication No. 2006-238053 (pages 4 and 5, FIG. 62). The disclosed planar display device includes a calibration unit that controls a control signal for photosensor pixels. In order to specify the position of a light-shielded portion, a read signal of each of the photosensor pixels is detected and a control signal for each of the photosensor pixels is controlled on the basis of the detected read signal so that the size of the light-shielded portion can be reduced to obtain one area. This structure allows accurate detection of the position of a light-shielded portion formed by an object.

An optical input device and information input method of the related art will be described briefly with reference to the drawings. FIGS. 15A and 15B are diagrams showing an example structure of an input device 200 of the related art. Referring to a block diagram shown in FIG. 15A, the input device 200 includes a display unit 201, a backlight 202 stacked below the display unit 201, a controller 203 that controls the display unit 201 and the backlight 202, and a storage unit 204.

The display unit 201 includes a plurality of pixels 210 arranged in a matrix. Referring to a schematic diagram shown in FIG. 15B, each of the pixels 210 includes a display color filter 211, an optical sensor 212 for detecting a light-shielded portion, a capacitor, and a wiring region 213. The pixels 210 emit light of colors in response to a control signal of the controller 203. The pixels 210 further detect a light-shielded portion and output the detection result to the controller 203.

In a case where the input device 200 having the structure described above performs input processing, first, the controller 203 controls the display unit 201 and the backlight 202 to perform display processing using the color filters 211 according to a display program stored in the storage unit 204.

An operator views images displayed on the display unit 201, for example, button icons, and touches a desired button icon with their finger. The display unit 201 detects a light-shielded portion formed by the finger using the optical sensors 212, and outputs the detection result to the controller 203. The controller 203 performs input processing according to the detection result and a program for input operations, which is stored in the storage unit 204. Further, the input device 200 sequentially performs difference determination, coordinate setting, and touch determination.

FIG. 16 is a diagram showing an example of difference determination performed by the input device 200. When a finger touches the display unit 201 shown in FIG. 16, a light-shielded portion 220 is formed at a touched portion of the display unit 201. The controller 203 detects a reduction in brightness and determines the light-shielded portion 220 on the basis of the reduction in brightness. The controller 203 also detects brightness levels of all the pixels 210, and determines a difference brightness level $X=|Xn-Xave|$ between an average brightness level Xave of the detected brightness levels of all the pixels 210 and a brightness level Xn of a pixel 210 that is located within the light-shielded portion 220. The controller 203 further performs difference determination to compare the difference brightness level X with a predetermined threshold value Xth. If the difference brightness level X is greater than the threshold value Xth, the controller 203 performs coordinate setting.

In coordinate setting shown in FIG. 17, the controller 203 defines a centroid 221 at the center of the light-shielded portion 220. After the centroid 221 is defined, the control device 203 starts touch determination.

In touch determination shown in FIG. 18, the controller 203 monitors changes in the difference brightness level X at the centroid 221. The controller 203 observes a relational characteristic of a derivative value (dX/dt) of the difference brightness level X with respect to time t shown in FIG. 18, and determines, for example, input processing at time t1 indicating an inflection point of the gradient of the characteristic. At time t2 indicating an inflection point at which the gradient disappears, the input processing is terminated. The input processing based on difference determination, coordinate setting, and touch determination is implemented in the following procedure.

FIG. 19 is a flowchart showing an example of an input process of the input device 200. Referring to the flowchart shown in FIG. 19, in step G1, the controller 203 executes difference determination to constantly compare the difference brightness level X with the threshold value Xth. When the difference brightness level X becomes greater than the threshold value Xth, the process proceeds to step G2.

In step G2, the controller 203 defines the coordinates of the centroid 221 of the light-shielded portion 220. Then, the process proceeds to step G3. In step G3, the controller 203 executes touch determination. When the gradient of the relational characteristic (see FIG. 18) of the derivative value (dX/dt) of the difference brightness level X with respect to time t is inflected or changed at the centroid 221, the control unit 203 detects the time t1 at which the inflection starts. After the time t1 is detected, the process proceeds to step G4, in which the controller 203 determines and executes input processing corresponding to a button icon displayed at the centroid 221. If no inflection is detected for the gradient of the derivative value (dX/dt), the process returns to step G2, and coordinate setting is executed again. After the input processing is executed in step G4, the process returns to step G1, and the difference determination is resumed.

Alternatively, after input determination is performed, processing similar to the processing of step G3 may be executed to detect the time t2 at which the gradient of the characteristic of the derivative value (dX/dt) disappears. In this case, it can be determined that the pressing of the button icon ends at time t2.

SUMMARY

An optical input device of the related art, such as the planar display device disclosed in Japanese Unexamined Patent Application Publication No. 2006-238053 (pages 4 and 5, FIG. 62), executes input processing on the basis of, mainly, information regarding the position (or coordinates) of the centroid of a finger. Thus, a problem occurs in that it is difficult to select an input mode in accordance with a pressing state of the finger, and the operator may feel uncomfortable during operation. Another problem is that the application to a scrolling operation is difficult because no data is stored for detecting movement of the centroid.

It is therefore desirable to provide an input device, a storage medium, an information input method, and an electronic apparatus in which input processing based on a plurality of different input modes can be implemented according to a pressing state or sliding movement of an operating member such as a finger.

According to an embodiment, an optical input device has a display screen, a portion of the display screen being shielded from light by an operating member to implement input processing based on a plurality of input modes. The input device includes input detection means including a display unit configured to display predetermined input information, the input detection means detecting at least one of an area and brightness of a light-shielded portion formed on the display screen by the operating member by approaching the display unit; and control means for providing display control of the display unit and input control on the basis of the at least one of an area and brightness detected by the input detection means. The control means compares the detected at least one of an area and brightness with a predetermined threshold value to select a desired input mode from among the plurality of input modes.

In the input device the control means configured to provide display and input control compares a detected area and/or brightness of a light-shielded portion formed by an operating member with a predetermined threshold value to select a desired input mode from a plurality of input modes. Therefore, input processing can be implemented for each stage of operation according to a pressing state of the operating member.

According to another embodiment, a storage medium stores a program adapted to implement input processing based on a plurality of input modes according to a light-shielding operation executed by an operating member on a display screen on which predetermined input information is displayed. The program includes the steps of detecting at least one of an area and brightness of a light-shielded portion formed on the display screen by the operating member by approaching the display screen; comparing the detected at least one of an area and brightness with a predetermined threshold value to select a desired input mode from among the plurality of input modes; defining a detection area so as to correspond to the input information on the basis of the selected input mode, the detection area having a shape and size corresponding to the selected input mode; detecting at least one of a position and movement of the light-shielded portion within the detection area; and determining input processing in the desired input mode on the basis of the detected at least one of a position and movement.

Therefore, an input device and electronic apparatus having the storage medium can be reproducibly operated.

According to another embodiment, an information input method for implementing input processing based on a plurality of input modes according to a light-shielding operation performed, using an operating member, on predetermined input information displaced on a display screen includes the steps of detecting at least one of an area and brightness of a light-shielded portion formed on the display screen by the operating member by approaching the display screen; comparing the detected at least one of an area and brightness with a predetermined threshold value to select a desired input mode from among the plurality of input modes: defining a detection area so as to correspond to the input information on the basis of the selected input mode, the detection area having a shape and size corresponding to the selected input mode; detecting at least one of a position and movement of the light-shielded portion within the detection area; and determining input processing in the desired input mode on the basis of the detected at least one of a position and movement.

In the information input method, an area and/or brightness of a light-shielded portion formed by an operating member is detected, and is compared with a predetermined threshold value to select a desired input mode from a plurality of input modes. Therefore, input processing can be implemented for each stage of operation according to a pressing state of the operating member.

According to another embodiment, an electronic apparatus includes an optical input device having a display screen, a portion of the display screen being shielded from light by an operating member to implement input processing based on a plurality of input modes. The input device includes input detection means having a display unit configured to display predetermined input information, the input detection means detecting at least one of an area and brightness of a light-shielded portion formed on the display screen by the operating member by approaching the display unit; and control means for providing display control of the display unit and input control on the basis of the at least one of an area and brightness detected by the input detection means. The control means compares the detected at least one of an area and brightness with a predetermined threshold value to select a desired input mode from among the plurality of input modes.

The electronic apparatus includes an input device of an embodiment. With this structure, input processing can be implemented for each stage of operation according to a pressing state of an operating member. Therefore, input processing can be implemented for each stage of operation such as startup, scrolling, or determination according to a pressing state of the operating member such as approaching, touching, or pressing.

According to an embodiment, control means for providing display and input control is provided. An area and/or brightness of a light-shielded portion formed an operating member is detected, and is compared with a predetermined threshold value to select a desired input mode from a plurality of input modes. With this structure, input processing can be implemented for each stage of operation according to a pressing state of the operating member. Therefore, input processing can be implemented for each stage of operation such as startup, scrolling, or determination according to a pressing state of an operating member such as approaching, touching, or pressing. Furthermore, a detection area suitable for each operation of input processing can be defined for an individual input mode to implement an easy scrolling operation. Moreover, a tactile sensation which mimics that of a mechanical operation button and/or a sound can be given to the operating member. Therefore, the uncomfortable feeling perceived by the operating member can be reduced, and the operability can be improved.

Additional features and advantages are described herein, and will be apparent from the following Detailed Description and the figures.

BRIEF DESCRIPTION OF THE FIGURES

FIGS. 3A to 3D are diagrams showing an example of input processing in an input mode I;

FIGS. 4A to 4D are diagrams showing an example of input processing in an input mode II;

FIGS. 5A to 5D are diagrams showing an example of input processing in an input mode III;

FIGS. 6A to 6D are diagrams showing examples of tactile sensations provided in the input mode II;

FIGS. 7A to 7F are diagrams showing examples of tactile sensations provided in the input mode III;

FIG. 8 is a table showing an example of conditions for selecting input modes;

FIG. 10 is a table showing an example of conditions for selecting input modes according to a second embodiment;

DETAILED DESCRIPTION

An input device, a storage medium, an information input method, and an electronic apparatus according to embodiments will now be described with reference to the drawings.

First Embodiment

Figure 1:
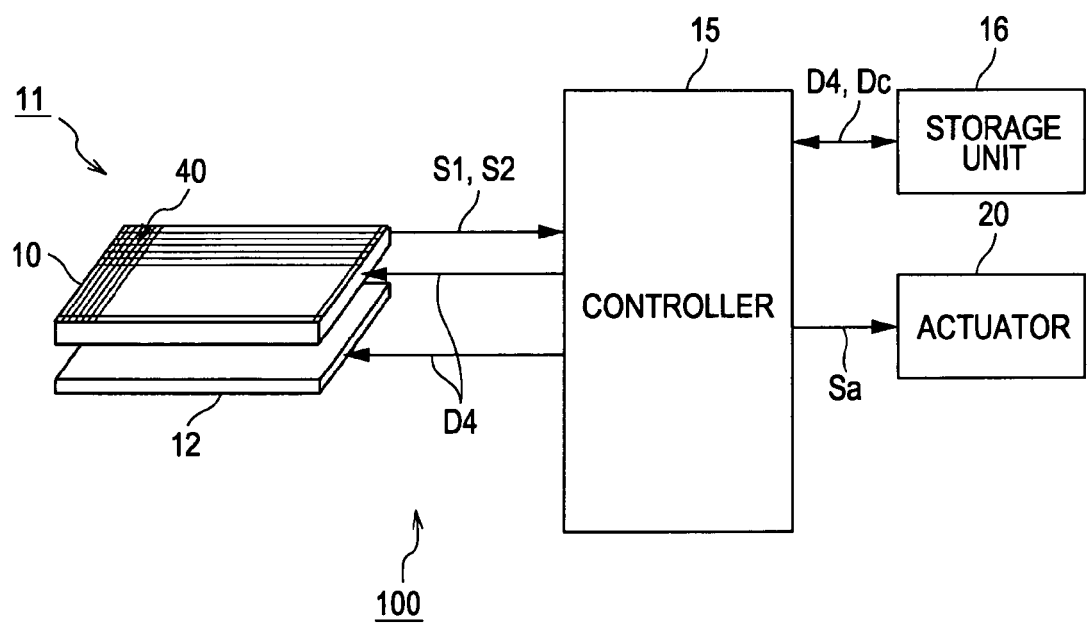
FIG. 1 is a diagram showing an example structure of an input device according to a first embodiment.

FIG. 1 is a diagram showing an example structure of an input device 100 according to a first embodiment. The input device 100 shown in FIG. 1 is suitably used for an electronic apparatus such as a mobile phone. The input device 100 includes a display screen 11 with built-in optical sensors, and implements information input based on sliding movement of an operating member touching the display screen 11. The input device 100 performs, instead of an existing input operation using operation buttons, a screen input operation by causing an operating member to approach, touch, and press input information displayed on the display screen 11, for example, an icon ICx (not shown in FIG. 1).

When a portion of the display screen 11 is shielded from light by an operating member such as a finger, the input device 100 estimates a pressing state of the operating member on the basis of the light-shielded portion, and implements input processing in a corresponding input mode. In this case, the input device 100 also provides a tactile sensation corresponding to the input operation of the operating member. The input device 100 includes the display screen 11, a controller 15, a storage unit 16, and an actuator 20.

The display screen 11 is a liquid crystal screen with built-in optical sensors, and includes a display unit 10 and a backlight 12. The display unit 10 includes a plurality of pixels 40 arranged in a matrix. Each of the pixels 40 includes a display color filter and an input-detection optical sensor. The pixels 40 emit light in response to a control signal D4 of the controller 15, and output brightness information S1 and position (coordinate) information S2 of the light-shielded portion to the controller 15.

The controller 15 provides display and input control of the display screen 11. The controller 15 that controls the display screen 11 is connected to the storage unit 16. The storage unit 16 is an example of a storage medium, and stores programs implementing input processing based on a plurality of input modes. The storage unit 16 stores display data D4 for providing display on the display screen 11, and control information Dc corresponding to the display data D4, such as the position of a detection area of the icon ICx and a vibration mode. The control information Dc includes a program for selecting a desired input mode from among a plurality of input modes, and threshold data used for selection of an input mode. The storage unit 16 may be an electrically erasable programmable read-only memory (EEPROM), a ROM, or a random access memory (RAM).

The controller 15 reads the control information Dc from the storage unit 16, and compares the detected area and/or brightness of the light-shielded portion on the display screen 11 with a predetermined threshold value to select a desired input mode from among a plurality of input modes. The controller 15 estimates a pressing state of the operating member on the basis of mainly the brightness information S1.

The controller 15 further supplies a vibration control signal Sa to the actuator 20 to generate a vibration mode corresponding to the input operation. The actuator 20 may be a micro receiver having an actuator function. The actuator 20 has functions of a receiver (or earpiece) for telephone calls, a speaker, and an actuator.

The actuator 20 vibrates the display screen 11 according to a vibration pattern corresponding to the input mode, and gives or presents a tactile sensation to the operating member. In response to an input of information using the display screen 11, the actuator 20 generates a click sound (cyber-switch operating sound) and gives a tactile sensation to an operator touching the display screen 11. The input device 100 is configured in the manner described above. The display screen 11 for inputting information will be described.

Figure 2A:
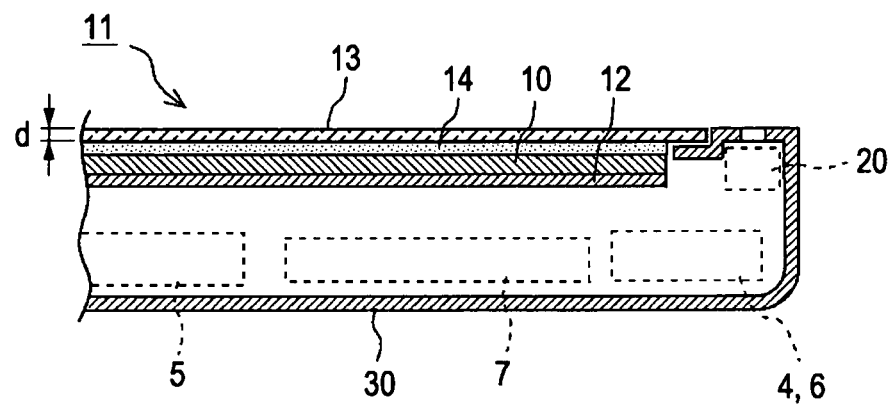
FIG. 2A is a schematic cross-sectional view showing an example structure of a display screen.
Figure 2B:
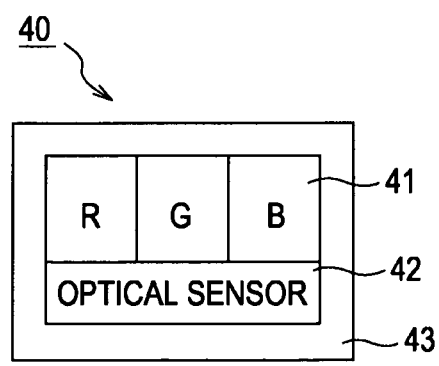
FIG. 2B is a diagram showing an example structure of a pixel of the display screen.

FIGS. 2A and 2B are diagrams showing an example structure of the display screen 11. The display screen 11 shown in FIG. 2A may be an example of input detection means. The display screen 11 includes the display unit 10 that displays predetermined input information, and detects the area, brightness, position, etc., of a light-shielded portion formed by an operating member approaching the display unit 10.

The display screen 11 is formed of a liquid crystal screen with built-in optical sensors. The display screen 11 includes a display plate 13 which is touched by an operating member, and an air space 14 provided below the display plate 13. Below the air space 14, the display unit 10 and the backlight 12 are provided. The display plate 13 may be formed of a glass, polymethylmethacrylate (PMMA), or polycarbonate (PC) plate with a thickness d of about 0.2 mm to about 1.5 mm. The air space 14 may be an air space with a thickness of about 25 μm to about 0.3 mm. Instead of an air space, a transparent adhesion layer may be formed. The display unit 10 includes the plurality of pixels 40. The display unit 10 and the backlight 12 for liquid crystal display are connected to the controller 15.

Figure 11:
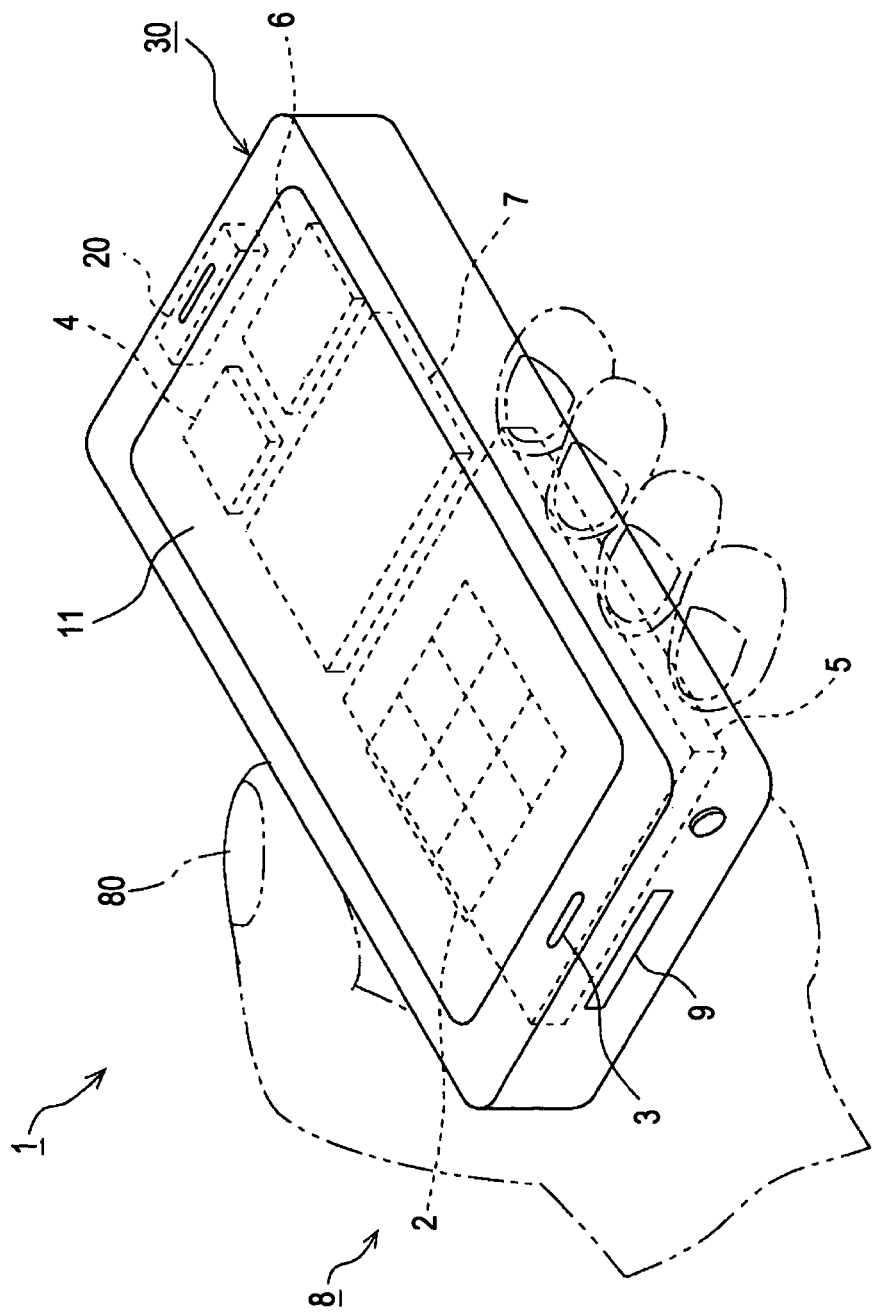
FIG. 11 is a perspective view showing an example structure of a mobile phone according to a third embodiment.

The display screen 11 is connected to, for example, a housing 30 of a mobile phone 1 (see FIG. 11). The mobile phone 1 includes no operation button, and is configured such that a finger touches or presses on the display screen 11 to implement information processing such as telephone calling, email communication, or photographing. A camera 4 is mounted on a rear surface of the display screen 11, and is operated to capture an object image. The actuator 20 is provided on an upper portion of the housing 30. A module antenna 6 is mounted inside the housing 30, and a circuit substrate 7 is provided within the housing 30. A battery 5 is accommodated in the housing 30 to supply power to the circuit substrate 7, the display screen 11, and other units.

Referring to a schematic diagram shown in FIG. 2B, each of the pixels 40 of the display unit 10 includes a display color filter 41, an optical sensor 42 for input detection, a capacitor, and a wiring region 43. Each of the pixels 40 causes the color filter 41 to emit light in response to a control signal D4 of the controller 15, and the optical sensor 42 mainly detects the brightness of received light. The display unit 10 outputs light-shielding information including brightness information S1 and position information S2, which is detected by the optical sensors 42, to the controller 15. The display screen 11 is configured in the manner described above.

The input device 100 selects a desired input mode from among a plurality of input modes according to the light-shielding information from the display screen 11. The input device 100 selects an input mode I when a finger 80, which is an example of an operating member, approaches the display screen 11, selects an input mode II when the finger 80 touches the display screen 11, and selects an input mode III when the finger 80 presses on the display screen 11. The details of input processing in the input modes I to III will be described in the context of an address search operation of the mobile phone 1.

FIGS. 3A to 3D are diagrams showing an example of input processing in the input mode I. When a user who desires to start address search places the finger 80 close to the display screen 11 of the input device 100, first, the input mode I is selected. The input mode I is selected when, as shown in a perspective view of FIG. 3A, the finger 80 approaches the display screen 11 so that the distance between the display screen 11 and the finger 80 becomes substantially equal to a value Δh.

When the finger 80 approaches the display screen 11, a light-shielded portion 82 is produced by the shadow of the finger 80. The light-shielded portion 82 has a brightness level Xn lower than an average brightness level Xave of the entire display screen 11. The controller 15 determines the difference brightness level X=|Xn−Xave| between the brightness level Xn and the average brightness level Xave on the basis of the brightness information S1, and operates to select the input mode I if the difference brightness level X is within a selection range for the input mode I.

If the input mode I is selected, input processing for starting address search is executed. Icons IC1 and IC2 are displayed on the display screen 11. The icons IC1 and IC2 indicate input information to be selected. The icon IC1 represents a group number, and the icons IC2 represent names of persons included in a group identified by the group number.

Figure 3A:
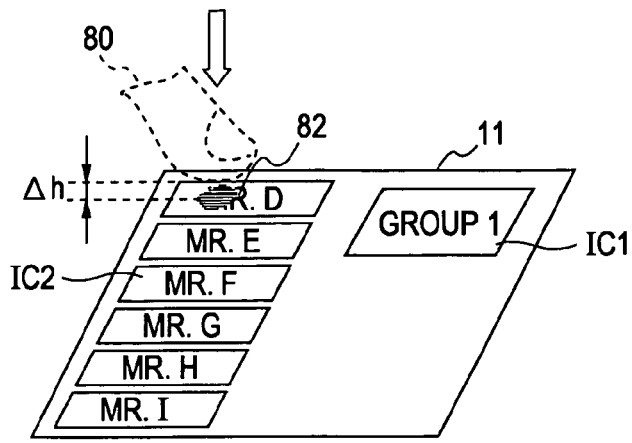
Figure 3B:
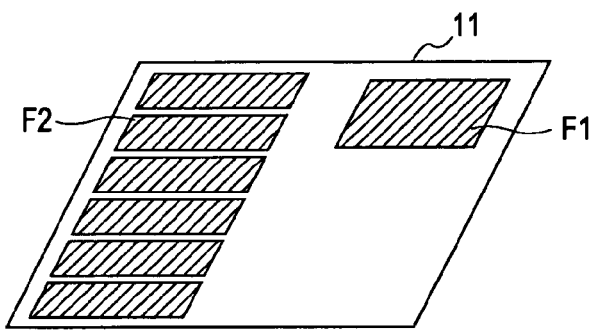
Figure 3C:
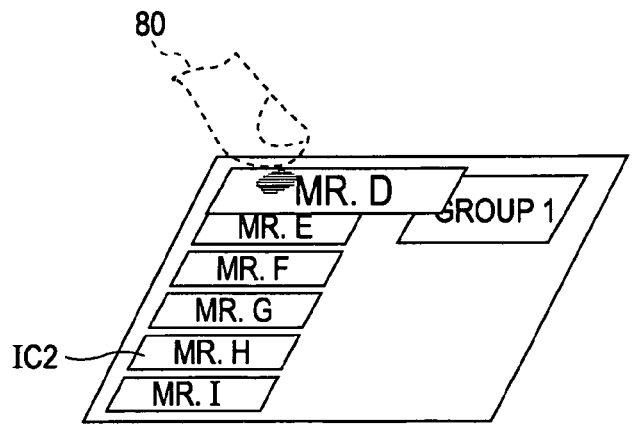

In the input mode I, detection areas F1 and F2 are defined at positions corresponding to those of the icons IC1 and IC2 on the display screen 11 so as to have the same shapes and sizes as the icons IC1 and IC2, respectively (see FIG. 3B). That is, the icons IC1 and IC2 and the detection areas F1 and F2 are formed using the color filters 41 and optical sensors 42 of identical pixels 40. In the following processing in the input mode I, input detection is performed using the pixels 40 of the detection areas F1 and F2.

After the detection areas F1 and F2 are defined, processing based on the position information S2 is mainly performed. In this processing, the controller 15 detects the coordinates of the centroid of the light-shielded portion 82 on the basis of the position information S2. When the coordinates of the centroid of the light-shielded portion 82 are detected, as shown in a perspective view of FIG. 3C, one of the icons IC2 that is located below the finger 80 is displayed in an enlarged manner.

As shown in a table of FIG. 3D, in the input mode I, no sound or tactile sensation is generated in accordance with the input processing. The input mode I allows a user to recognize that the mobile phone 1 has identified the position of the finger 80 and has started input processing. When the finger 80 further approaches and touches the display screen 11, the input mode II is selected.

FIGS. 4A to 4D are diagrams showing an example of input processing in the input mode II. The input mode II is selected when, as shown in a perspective view of FIG. 4A, the finger 80 touches the display screen 11. The controller 15 operates to select the input mode II if the difference brightness level X is within a selection range for the input mode II. If the input mode II is selected, input processing for scrolling is executed.

If the input mode II is selected, detection areas F3 and F4 are defined in edge portions of the icons IC1 and IC2 on the display screen 11 (see FIG. 4B). When the light-shielded portion 82 moves across the detection area F3 or the detection areas F4, as shown in a perspective view of FIG. 4C, the icons IC2 are scrolled in a movement direction of the finger 80. In this case, the direction of scrolling, the speed of scrolling, and the amount of scrolling are determined on the basis of the moving direction, moving speed, and moving amount of the centroid of the light-shielded portion 82, which are derived from the position information S2.

As shown in a table of FIG. 4D, in the input mode II, a sound and a *tactile sensation are generated in accordance with the scrolling operation. For example, a small beep sound is generated when the finger 80 moving across the display screen 11 passes through the detection area F4 formed in the edge portion of the icon IC2. A vibration waveform for shape recognition is also generated at the same time. At this time, the finger 80 perceives a tactile sensation similar to that of tracing along the periphery of an operation button. After the icons IC2 indicating the names of persons to be searched in the input mode II are displayed, the user presses a desired one of the icons IC2 with the finger 80. In response to the pressing operation by the finger 80, the input mode III is selected.

FIGS. 5A to 5D are diagrams showing an example of input processing in the input mode III. The input mode III is selected when, as shown in a perspective view of FIG. 5A, a pressing operation by the finger 80 is performed. The controller 15 operates to select the input mode III if the difference brightness level X is within a selection range for the input mode III.

In the input mode III, input processing for determination (or setting) is executed. If the input mode III is selected, detection areas F5 and F6 shown in FIG. 5B are defined in center portions of the icons IC1 and IC2 on the display screen 11.

After the input mode III is set, when the centroid of the light-shielded portion 82 is detected in any of the detection areas F5 and F6, as shown in a perspective view of FIG. 5C, the color of one of the icons IC2 that has been pressed by the finger 80 is changed. For example, the color of an icon area and the color of text are reversed.

As shown in a table of FIG. 5D, a sound and a tactile sensation are generated in accordance with the determination operation. In the input mode III, when the finger 80 presses any of the detection areas F5 and F6 on the display screen 11, for example, a relatively strong sound, e.g., a warning beep sound, is generated and a vibration waveform for providing a click feeling is also generated. The vibration waveform gives a click feeling to the finger 80, which is similar to the feel of pressing a tact button, and the sound allows the user to recognize that determination has been entered. A tactile sensation providing function in the input modes II and III will be described.

FIGS. 6A to 6D are diagrams showing examples of tactile sensations provided in the input mode II. FIG. 6A shows a manner in which the finger 80 traces along the periphery of a mechanical projecting operation button 83. Referring to FIG. 6A, when the finger 80 moves in a direction indicated by an arrow from a state 80a, the finger 80 touches an edge portion of the operation button 83 at a stage 80b (see FIG. 6B). When the finger 80 further moves in the direction indicated by the arrow, the finger 80 slides over an upper surface of the operation button 83 at a stage 80c, and touches the edge portion at a stage 80d. Then, the finger 80 enters a non-contact state 80e.

In the input mode II, a vibration waveform shown in FIG. 6C is generated from the actuator 20 to vibrate the display screen 11 when the finger 80 passes through any of the detection areas F3 and F4 shown in FIG. 4B in order to achieve the sensation of touching the operation button 83 shown in FIGS. 6A and 6B. When the finger 80 touching the display screen 11 passes through the icon ICx (any of the icons IC1 and IC2), the finger 80 perceives a relatively light tactile sensation such as a momentary vibration as shown in FIG. 6D. Thus, the operator perceives a tactile sensation similar to the sensation of tracing along the periphery of the operation button 83.

FIGS. 7A to 7F are diagrams showing examples of tactile sensations provided in the input mode III. FIG. 7A shows a manner in which the finger 80 presses a tact switch 84. Referring to FIG. 7A, the finger 80 moves in a pressing direction in stages 80f to 80i, presses the tact switch 84 to the bottom in a stage 80j, and moves in a releasing direction in stages 80k to 80n.

When the finger 80 moves from above in the pressing direction, a click feeling obtained when the tact switch 84 is turned on is obtained in the stage 80h (see FIG. 7B). When the finger 80 moves in the releasing direction after it presses the tact switch 84 to the bottom, a click feeling obtained when the tact switch 84 is turned off is obtained in the stage 80l. This is because, as shown in FIG. 7D, a reaction force of the tact switch 84 is exerted against the pressing force of the finger 80 shown in FIG. 7C.

In the input mode III, a vibration waveform shown in FIG. 7E is generated from the actuator 20 to vibrate the display screen 11 when the finger 80 presses any of the detection areas F5 and F6 shown in FIG. 5B in order to achieve the sensation of pressing the tact switch 84 shown in FIG. 7A. When the finger 80 touching the display screen 11 presses the icon ICx, a click feeling such as a momentary vibration as shown in FIG. 7F is obtained. Thus, the operator pressing the icon ICx perceives a tactile sensation similar to the sensation of pressing the tact switch 84. In this way, the tactile sensation function in the input modes II and III is implemented. Selection conditions for identifying the input modes I to III will be described.

FIG. 8 is a table showing an example of conditions for selecting input modes. In the first embodiment, an input mode is selected by determining whether or not the difference brightness level X determined from the brightness information S1 satisfies a predetermined selection condition. For example, in determination 1, it is determined whether or not the difference brightness level X satisfies a selection condition of the input mode I. If the selection condition is satisfied, the input mode I is selected (see FIG. 9).

In an input mode selection process based on the brightness in this example, brightness threshold data D11, D12, and D13 (where D11<D12<D13) are read from the control information Dc stored in the storage unit 16. The threshold data D11 to D13 are determined in advance based on an experimental result or the like, and are stored in the storage unit 16.

The selection of an input mode is performed on the basis of the magnitude of the difference brightness level $X=|Xn-Xave|$. The difference brightness level X is a difference between an average Xave of brightness levels detected from all the pixels 40 and a brightness level Xn detected from a pixel in the light-shielded portion 82.

Determination 1 is a determination for the input mode I. In determination 1, it is determined whether or not the difference brightness level X satisfies a selection condition of the input mode I. In the selection condition for determination 1, the difference brightness level X falls within a range of equal to or more than the threshold data D11 and less than the threshold data D12. The threshold data D11 and D12 are set to a minimum value and maximum value of the difference brightness level X, respectively, which are obtained when the distance between the finger 80 and the display screen 11 is substantially equal to the value Δh.

Determination 2 is a determination for the input mode II. In determination 2, it is determined whether or not the difference brightness level X satisfies a selection conditions of the input mode II. In the selection condition for determination 2, the difference brightness level X falls within a range of equal to or more than the threshold data D12 and less than the threshold data D13. The threshold data D12 and D13 are set to a minimum value and maximum value of the difference brightness level X, respectively, which are obtained when the finger 80 touches the display screen 11.

Determination 3 is a determination for the input mode III. In determination 3, it is determined whether or not the difference brightness level X satisfies a selection condition of the input mode III. In the selection condition for determination 3, the difference brightness level X falls within a range of equal to or more than the threshold data D13. The threshold data D13 is set to a minimum value of the difference brightness level X, which is obtained when the finger 80 presses the display screen 11. Accordingly, the determination based on the selection conditions are executed to select an input mode. An information input method using those selection conditions will be described.

Figure 9:
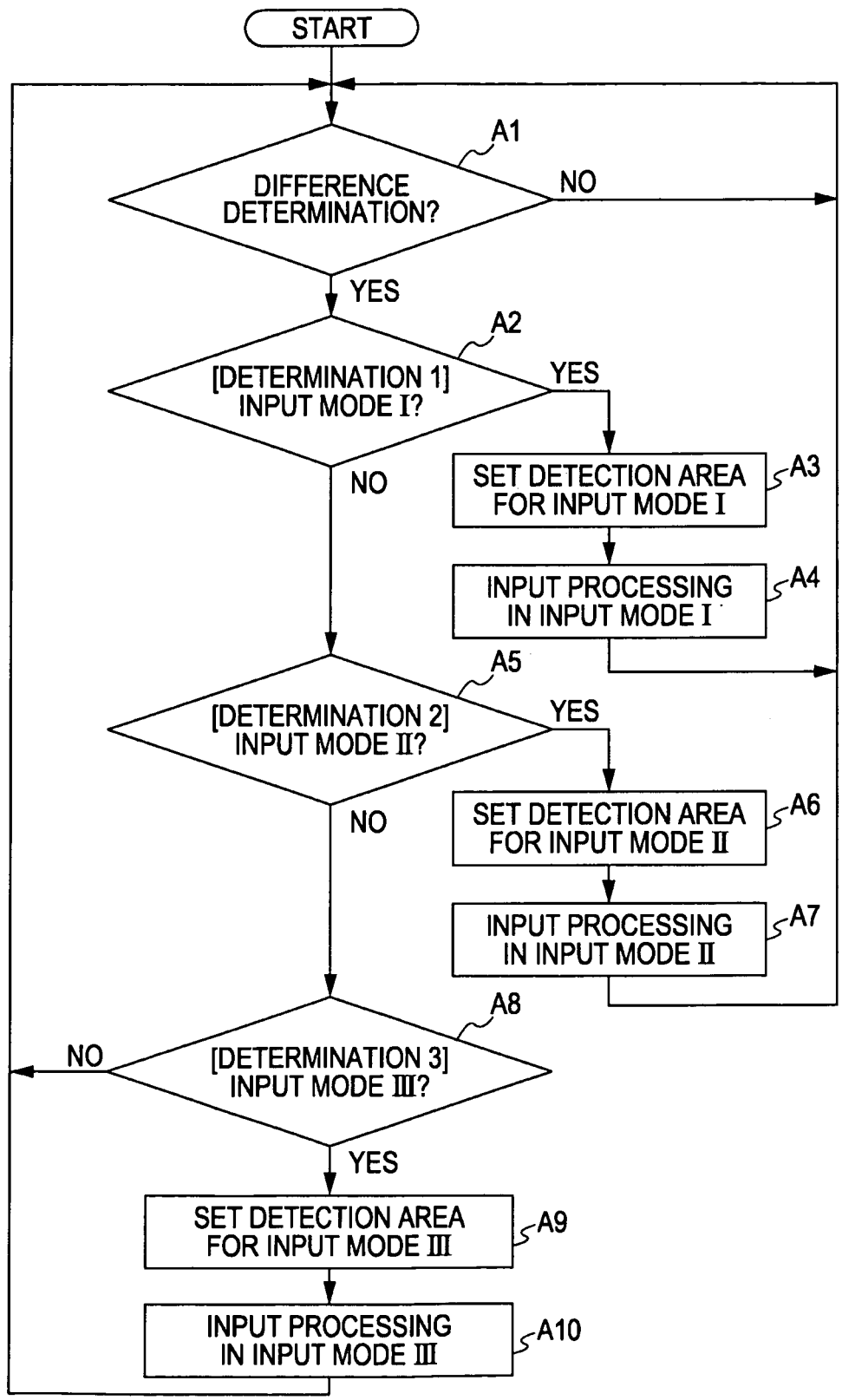
FIG. 9 is a flowchart showing an example of an input process of the input device.

FIG. 9 is a flowchart showing an example of an input process of the input device 100. In a case where the mobile phone 1 is operated, when the finger 80 approaches the display screen 11 on which the icon ICx is displayed, first, the controller 15 estimates a pressing state (such as approaching, touching, or pressing) of the finger 80 to select an input mode, and executes input processing for each stage of operation.

For example, in the input processing for address search, any of the input modes I to III described with reference to FIGS. 3A to 5D is selected, and input processing for startup, scrolling, and determination is executed. Programs and threshold data for these operations of input processing are stored as the control information Dc in the storage unit 16.

The controller 15 reads a program and threshold data corresponding to an input operation of an operating member from the control information Dc, and executes input processing corresponding to an input mode. In step A1 shown in the flowchart of FIG. 9, the controller 15 executes difference determination using the read program and threshold data as processing conditions, and detects the finger 80 approaching the display screen 11. At this time, the controller 15 calculates the difference brightness level X of the light-shielded portion 82, and determines whether or not the difference brightness level X is equal to or more than, for example, the threshold data D11. When the difference brightness level X becomes equal to or more than the threshold data D11, it is determined that the finger 80 has approached the display screen 11. Then, the process proceeds to step A2.

In step A2, determination 1 is executed, and it is determined whether or not an input mode, which is selected from the approaching state of the finger 80, is the input mode I. The controller 15 compares the difference brightness level X with the threshold data D11 and D12 to determine whether or not the difference brightness level X is equal to or more than the threshold data D11 and is less than the threshold data D12. When the difference brightness level X is equal to or more than the threshold data D11 and is less than the threshold data D12, the input mode I is selected. Then, the process proceeds to step A3. If the input mode I is not selected, the process proceeds to step A5.

In step A3, the controller 15 defines the detection areas F1 and F2 for the input mode I at display positions of icons ICx on the display screen 11. In this example, the detection areas F1 and F2 are defined so as to overlap the icons IC1 and IC2, respectively. After the detection areas F1 and F2 are defined, the process proceeds to step A4.

In step A4, the input processing corresponding to the input mode I is executed, and a position of the light-shielded portion 82 in any of the detection areas F1 and F2 is detected. At this time, the controller 15 calculates the coordinate information of the centroid of the light-shielded portion 82 on the basis of the position information S2 to determine one of the icons ICx that is located below the finger 80, and displays this icon ICx in an enlarged manner. The enlarged display of the icon ICx allows the operator to recognize the ability of input operation using the icon ICx or the start of the input processing.

If the input mode I is not selected and the process proceeds from step A2 to step A5, determination 2 is executed, and the difference brightness level X is compared with the threshold data D12 and D13 to determine whether or not the selection condition of the input mode II is satisfied. That is, it is determined whether or not the finger 80 has touched the display screen 11. For example, as indicated in determination 2 shown in FIG. 8, it is determined whether or not the difference brightness level X is equal to or more than the threshold data D12 and is less than the threshold data D13. If the input mode II is determined as a result of the determination, the process proceeds to step A6. If the input mode II is not determined, the process proceeds to step A8.

In step A6, detection areas for the input mode II are defined on the display screen 11. For example, the detection areas F3 and F4 are defined in edge portions of the icons IC1 and 1C2, respectively. After the detection areas F3 and F4 are defined, the process proceeds to step A7.

In step A7, the input processing for the input mode II is executed. At this time, the controller 15 scrolls an icon ICx located below the finger 80 according to the moving direction, moving speed, and moving amount of the centroid of the light-shielded portion 82, which are determined on the basis of the position information S2. In this scroll operation, the vibration waveform shown in FIG. 6C is generated to provide a tactile sensation for shape recognition, which is perceived when the operator traces along the periphery of the operation button 83; to the operator. In addition to the tactile sensation, the sound shown in FIG. 4D is generated to give a scroll feeling to the operator, and a scroll speed is also presented.

If the input mode II is not selected and the process proceeds from step A5 to step A8, determination 3 is executed, and it is determined whether or not the selection condition of the input mode III is satisfied. That is, it is determined whether or not a pressing operation has been performed by the finger 80. For example, as indicated in determination 3 shown in FIG. 8, the difference brightness level X is compared with the threshold data D13. If the difference brightness level X is equal to or more than the threshold data D13, the input mode III is determined. Then, the process proceeds to step A9. If the input mode III is not determined in determination 3, the process returns to step A1. If the process returns to step A1, the difference determination process starts again.

In step A9, detection areas for the input mode III are defined on the display screen 11. For example, the detection areas F5 and F6 are defined at the center portions of the icons IC1 and IC2, respectively. After the detection areas F5 and F6 are defined, the process proceeds to step A10.

In step A10, input processing for the input mode III is executed. At this time, the controller 15 changes the color of an icon ICx pressed by the finger 80 on the basis of the coordinate information of the centroid of the light-shielded portion 82 specified by the position information S2, and performs input processing for the determination stage to determine and enter the input information of the icon ICx. In the pressing operation for the determination, the vibration waveform shown in FIG. 7E is generated by the actuator 20 to give a tactile sensation, which mimics a click feeling of the tact switch 84, to the operator. In addition to the tactile sensation, the sound shown in FIG. 5D is generated to allow the operator to recognize that the determination has been done. The input process of the input device 100 is executed in the manner described above.

Accordingly, the input device 100 according a first embodiment is configured such that the controller 15 that provides display and input control compares a detected brightness of the light-shielded portion 82 formed by the finger 80 with a predetermined threshold value to select a desired input mode from among the three input modes. Therefore, input processing can be implemented for each stage of operation according to a pressing state of the finger 80. For example, input processing can be implemented for a stage of operation such as startup, scrolling, or determination according to a pressing state of the finger 80 such as approaching, touching, or pressing.

Furthermore, a detection area suitable for each operation of input processing can be defined for every input mode, resulting in an improvement in operability. For example, the detection areas F3 and F4 for scrolling can be defined in the edge portions of the icons ICx, thus providing an easy scrolling operation.

Moreover, a tactile sensation or sound which mimics that of a mechanical operation button can be given to an operating member. For example, in the scrolling process, a tactile sensation of tracing along the periphery of an operation button can be provided using the detection areas F3 and F4 defined in the edge portions. The uncomfortable feeling perceived by the operating member can therefore be reduced.

In addition, the detection areas F5 and F6 for determination can be defined at the center portions of icons ICx. Thus, the space between adjacent detection areas is increased to prevent erroneous input for determination.

Second Embodiment

FIG. 10 is a table showing an example of conditions for selecting input modes according to a second embodiment. In the second embodiment, when the input device 100 described in the first embodiment executes input processing according to the process shown in the flowchart of FIG. 9, area-based determination rather than brightness-based determination is performed. In the second embodiment, the controller 15 of the input device 100 determines whether or not the area (or the number pixels) of the light-shielded portion 82 satisfies a predetermined selection condition to select an input mode.

In this input mode selection, the threshold data D11 and D12 of the difference brightness level X and threshold data D21 and D22 of an area (where D21<D22) are read from the control information Dc stored in the storage unit 16. The threshold data D21 and 22 are determined based on an experimental result, statistic result, or the like, and are stored in advance in the storage unit 16.

The input device 100 detects areas (or the numbers of pixels) N×1 and N×2 of the light-shielded portion 82 on the basis of the brightness information S1 and the position information S2. The area N×1 represents the number of pixels obtained when the difference brightness level X is equal to or more than the threshold data D11 and is less than the threshold data D12, and the area N×2 represents the number of pixels obtained when the difference brightness level X is equal to or more than the threshold data D12 (D11<D12). That is, the area N×1 indicates the area of a shadow of the finger 80 that has not touched the display screen 11, and the area N×2 indicates the area of a portion touched by the finger 80.

Determination 1 is a determination for the input mode I. In determination 1, it is determined whether or not a selection condition of the input mode I is satisfied. In this example, the selection condition for determination 1 is that the area N×1 is greater than the threshold data D21. The threshold data D21 is set so as to match an area of the shadow of the finger 80, which is obtained when the distance between the finger 80, and the display screen 11 becomes substantially equal to a value Δh.

Determination 2 is a determination for the input mode II. In this example, the selection condition for determination 2 is that the area N×1 is greater than the threshold data D21 and that the area N×2 is less than the threshold data D22. The threshold data D22 is set to be greater than an area of a touched portion, which is obtained when the finger 80 lightly touches the display screen 11.

Determination 3 is a determination for the input mode III. In this example, the selection condition for determination 3 is that the area N×1 is greater than the threshold data D21 and that the area N×2 is equal to or greater than the threshold D22. The threshold data D22 is set to be less than an area of a touched portion, which is obtained when the finger 80 presses on the display screen 11.

There are different sizes of the finger 80 of the human depending on age, sex, and physical characteristics. In order to cover such differences, a plurality of items of threshold data D21 and D22 may be stored in the storage unit 16 so that a user can select any item of the threshold data D21 and D22, which is suitable for their finger. For example, a large, medium, or small size may be selected. Alternatively, a program for learning the size of the finger 80 of the user may be stored in the storage unit 16.

Accordingly, the input device 100 according to a second embodiment is configured such that the controller 15 compares a detected area and brightness (mainly, the area) of a light-shielded portion formed by an operating member with a predetermined threshold value to select a desired input mode from among a plurality of input modes.

Therefore, input processing can be implemented for each stage of operation (each input mode) according to a pressing state of the operating member. Furthermore, overall determination based on the difference-brightness threshold data D11 and D12 and the area threshold data D21 and D22 ensures more accurate selection.

Third Embodiment

FIG. 11 is a perspective view showing an example structure of a mobile phone 1 according to a third embodiment. The mobile phone 1 shown in FIG. 11 includes an input device 100 according to an embodiment, and is configured such that a display screen 11 on which certain input information is displayed is touched. The mobile phone 1 may be an example of an electronic apparatus, and executes input processing based on a plurality of input modes in accordance with a pressing state on the display screen 11. The mobile phone 1 implements various types of information processing, such as telephone calling, email communication, or photographing by sliding over the display screen 11 or pressing on the display screen 11 with the finger 80. In the third embodiment, the same names and reference numerals as those of the first embodiment have the same or similar functions and configurations, and will not be discussed herein.

The mobile phone 1 has a housing 30, and the display screen 11 of the input device 100 is disposed over substantially the entirety of a front surface of the housing 30. In the third embodiment, input information such as a plurality of button icons or an operation panel 8 is displayed on the display screen 11. An icon image for input operation displayed on the display screen 11 is operated with a finger to enter information corresponding to the displayed icon image.

For example, in an address search operation, a list of names of persons stored in a memory is displaced on the displace screen 11. In a telephone number entering operation, the operation panel 8 is displayed on the display screen 11. The operation panel 8 includes a plurality of push button switches 2. The push button switches 2 may include, for example, number keys indicating numbers "0" to "9", symbol keys indicating symbols such as "*" and "#", hook buttons such as "on-hook" and "off-hook" keys, and a menu key.

A camera 4 is mounted on a rear surface of the display screen 11, and is operated to capture an object image. A microphone 3 for telephone calls is mounted in a lower portion on the front surface of the housing 30, and functions as a telephone mouthpiece.

An actuator 20 is provided on an upper center portion on the front surface of the housing 30, and has functions of a receiver (or earpiece) for telephone calls and an actuator that provides a tactile sensation. The actuator 20 generates a click sound (cyber-switch operation sound) and gives a tactile sensation to the finger 80 of the operator touching the display screen 11 according to the input of information on the display screen 11.

A connector 9 such as a universal serial bus (USB) terminal is placed on a front outer side of the housing 30 to allow communication with an external apparatus. A module antenna 6 is mounted inside the housing 30, and a loud sound speaker (not shown) is provided in an inner peripheral portion of the antenna 6 to output sound such as ringer melody or music attached to video data. A circuit substrate 7 is provided within the housing 30. A battery 5 is accommodated in the housing 30 to supply power to the circuit substrate 7, the display screen 11, and other units. The mobile phone 1 is configured in the manner described above.

Figure 12:
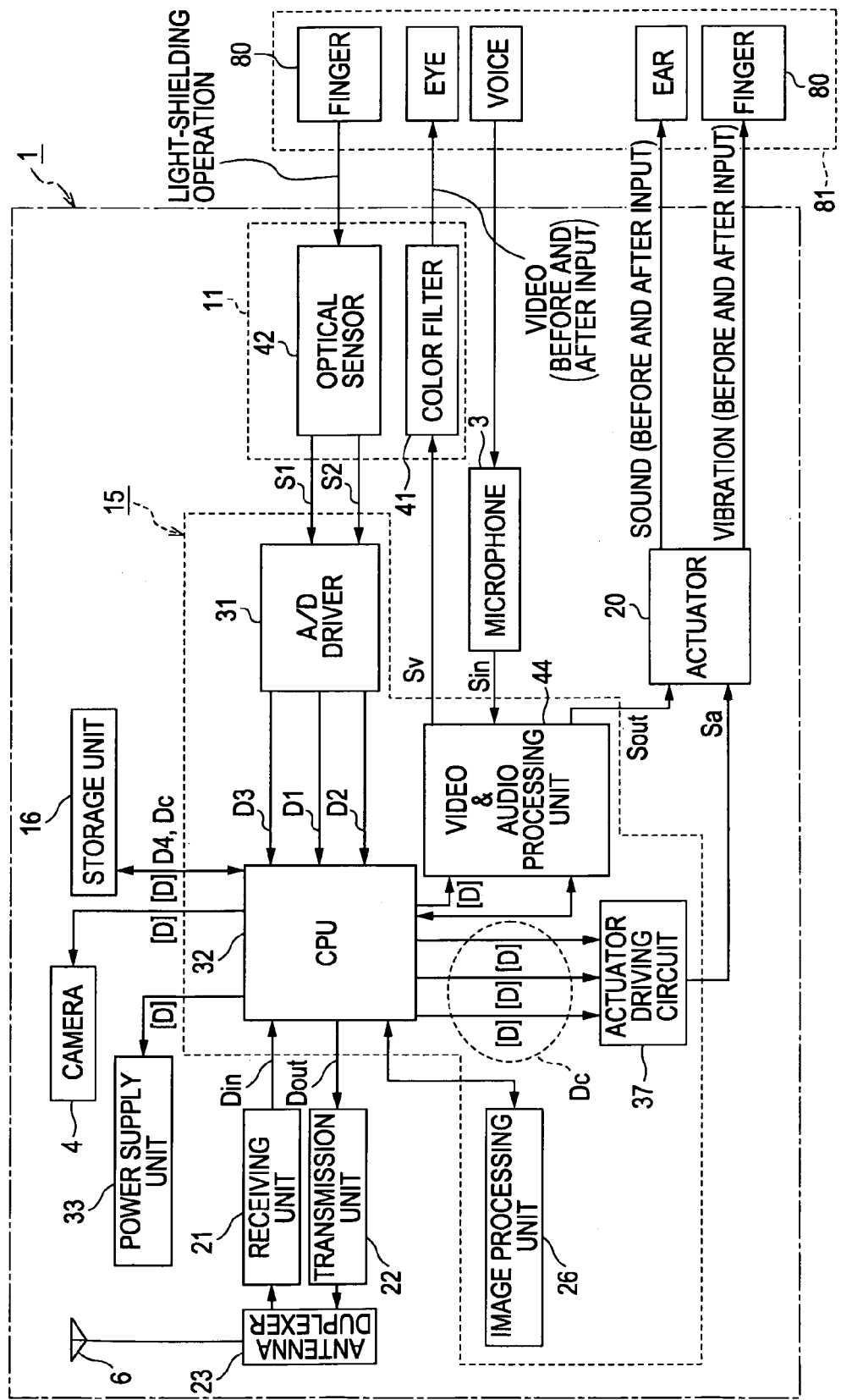
FIG. 12 is a block diagram showing an example internal structure of the mobile phone.

Next, an example internal structure of the mobile phone 1 and a tactile feedback input method will be described. FIG. 12 is a block diagram showing an example internal structure of the mobile phone 1.

The mobile phone 1 shown in FIG. 12 is configured such that blocks having the respective functions are mounted on the circuit substrate 7 of the housing 30. The mobile phone 1 includes a controller 15, a receiving unit 21, a transmission unit 22, an antenna duplexer 23, a display screen 11, an actuator 20, a power supply unit 33, a camera 4, and a storage unit 16.

A portion of the display screen 11 shown in FIG. 12 is shielded from light by a finger 80 of an operator (or user) 81 to produce at least brightness information S1 and position information S2. The controller 15 includes an analog-to-digital (A/D) driver 31, a central processing unit (CPU) 32, an image processing unit 26, and an actuator driving circuit 37. The A/D driver 31 is supplied with the brightness information S1 and the position information S2 from the display screen 11.

The A/D driver 31 converts an analog signal formed of the brightness information S1 and the position information S2 into digital data to identify a pressing state of an operating member. The A/D driver 31 further performs calculation on the digital data to select an input mode according to the pressing state, and supplies flag data D3 for identifying the input mode, or brightness information D1 or position information D2, to the CPU 32. This calculation may be executed within the CPU 32.

The CPU 32 is connected to the A/D driver 31. The CPU 32 controls the overall operation of the mobile phone 1 according to a system program. The storage unit 16 stores system program data for controlling the overall operation of the mobile phone 1. A RAM (not shown) is used as a work memory. Upon power on of the mobile phone 1, the CPU 32 reads the system program data from the storage unit 16 to load it into the RAM, and boots up the system to control the overall operation of the mobile phone 1.

For example, in response to the input data D1 to D3 from the A/D driver 31, the CPU 32 performs control to supply predetermined instruction data [D] to devices such as the batter (power supply unit) 5, the camera 4, the storage unit 16, the actuator driving circuit 37, and a video & audio processing unit 44, to obtain received data from the receiving unit 21, or to transfer transmission data to the transmission unit 22.

The actuator driving circuit 37 is connected to the CPU 32, and generates a vibration control signal Sa based on control information Dc from the CPU 32. The vibration control signal Sa has a sine output waveform. The actuator 20 is connected to the actuator driving circuit 37, and is vibrated in response to the vibration control signal Sa.

In addition to the actuator driving circuit 37, the image processing unit 26 is also connected to the CPU 32, and performs image processing on the display information D4 for displaying icons ICx. The display information D4 subjected to the image processing is supplied to the display screen 11.

When the finger 80 receives a vibration, the operator 81 perceives a tactile sensation and feels vibration for each function from the CPU 32. Content displayed on the display screen 11 and sound output from the actuator 20 allow the operator to determine the individual functions through visual perception and auditory perception, respectively.

Besides an input screen, a ringer image based on a video signal Sv may be displayed on the display screen 11.

The antenna 6 shown in FIG. 12 is connected to the antenna duplexer 23, and receives radio wave from the other party at the time of incoming call from a base station or the like. The antenna duplexer 23 is connected to the receiving unit 21. The receiving unit 21 receives reception data directed from the antenna 6 to demodulate audio and video data, and outputs the demodulated video and audio data Din to the CPU 32 or the like. The receiving unit 21 is connected to the video & audio processing unit 44 through the CPU 32. The video & audio processing unit 44 performs digital-to-analog conversion on digital audio data to output an audio signal Sout, and performs digital-to-analog conversion on digital video data to output the video signal Sv.

The video & audio processing unit 44 is connected to the actuator 20 having a telephone earpiece function and a speaker function, and a loud sound speaker (not shown). The loud sound speaker outputs sound such as a ringtone or ringer melody at the time of incoming call. The actuator 20 receives the audio signal Sout, and increases the volume level of the voice of the other party. In addition to the actuator 20, the microphone 3 serving as a telephone mouthpiece is also connected to the video & audio processing unit 44. The microphone 3 collects the voice of the operator 81, and outputs an audio signal Sin. At the time of outgoing call, the video & audio processing unit 44 performs analog-to-digital conversion on the analog audio signal Sin to be transmitted to the other party to output digital audio data, and performs analog-to-digital conversion on the analog video signal Sv to output digital video data.

In addition to the receiving unit 21, the transmission unit 22 is further connected to the CPU 32. The transmission unit 22 modulates data to be transmitted to the other party, such as video and audio data Dout, and to supply the modulated transmission data to the antenna 6 through the antenna duplexer 23. The antenna 6 radiates the radio waves supplied from the antenna duplexer 23 to the base station or the like.

In addition to the transmission unit 22, the camera 4 is also connected to the CPU 32. An image of an object is photographed, and image information such as still-image information or moving-image information is transmitted to the other party through the transmission unit 22. The power supply unit 33 includes the battery 5 (not shown in FIG. 12) to supply direct-current (DC) power to the controller 15, the display screen 11, the receiving unit 21, the transmission unit 22, the actuator 20, the camera 4, and the storage unit 16.

Accordingly, the mobile phone 1 provides direct input of position information of an icon touched by an operator, and enables selection of a desired input mode from among a plurality of input modes according to a pressing state of the operator. Further, in case of using different applications, different input modes can be implemented in accordance with the operations of the different applications.

Furthermore, a detection area, such as the detection areas F3 and F4 shown in FIG. 4B, can be defined in an edge portion of the operation panel 8 of the third embodiment. With the use of such a detection area, a tactile sensation of tracing along the periphery of an existing operation button can be given to the operator, and an operation similar to the operation of an existing mobile phone can be implemented.

Fourth Embodiment

Figure 13:
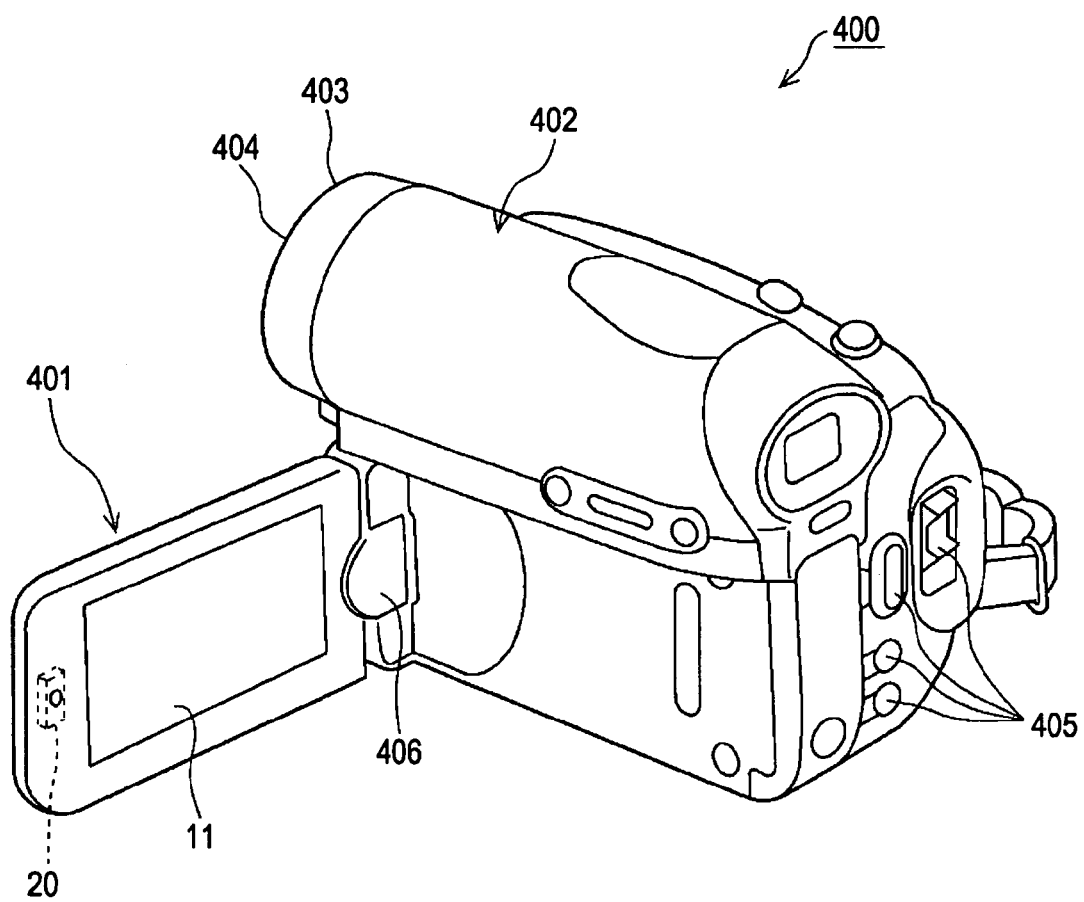
FIG. 13 is a perspective view showing an example structure of a video camera according to a fourth embodiment.

FIG. 13 is a perspective view showing an example structure of a video camera 400 according to a fourth embodiment, including an input device 100 according to an embodiment. The video camera 400 shown in FIG. 13 may be another example of an electronic apparatus, in which a display screen of the video camera 400 is touched by an operating member (or operator) to enter information. The video camera 400 captures an object image and records ambient sound. The video camera 400 includes the input device 100, which is described in the first embodiment. A display screen 11 and a storage unit 16 according to an embodiment are applied to the input device 100.

The video camera 400 has a casing 402 that defines an outer surface, and a lens barrel 403 having a photographic optical system 404 incorporated therein is provided on an upper portion on a front surface of the casing 402. The lens barrel 403 has an image element (not shown) incorporated at a rear end thereof. The image element is configured to capture an object image introduced by the photographic optical system 404.

Various operation switches 405 including a power switch, a shooting start/stop switch, and a zoom switch are provided on a rear surface, upper surface, and side surfaces of the casing 402. A touch panel display device 401 is disposed on a left side surface of the casing 402 so as to be connected to the casing 402 in an openable and closable manner through a hinge 406, and displays an image captured by the imaging element (not shown).

The touch panel display device 401 includes the input device 100 and the actuator 20 having an actuator function, which are described in the first embodiment.

In the fourth embodiment, when an icon image for input operation displayed on the display screen 11 serving as a monitor of the touch panel display device 401 is operated with a finger of an operator, a desired input mode is selected according to the brightness or area of a light-shielded portion formed by the finger, and is executed. Further, a click sound (cyber switch operation sound) is generated from the actuator 20, and a tactile sensation is given to the finger of the operator touching the display screen.

Accordingly, the video camera 400 according to the fourth embodiment includes the optical input device 100 according to an embodiment. The controller 15 compares a detected area or brightness of a light-shielded portion formed by an operating member with a predetermined threshold value to select a desired input mode from among a plurality of input modes. Therefore, input processing can be implemented for each stage of operation (each input mode) according to a pressing state of the operating member.

Since the actuator 20 is provided, a tactile sensation can be given to a finger of an operator of the video camera 400 on the basis of an input operation on the display screen 11.

Fifth Embodiment

Figure 14:
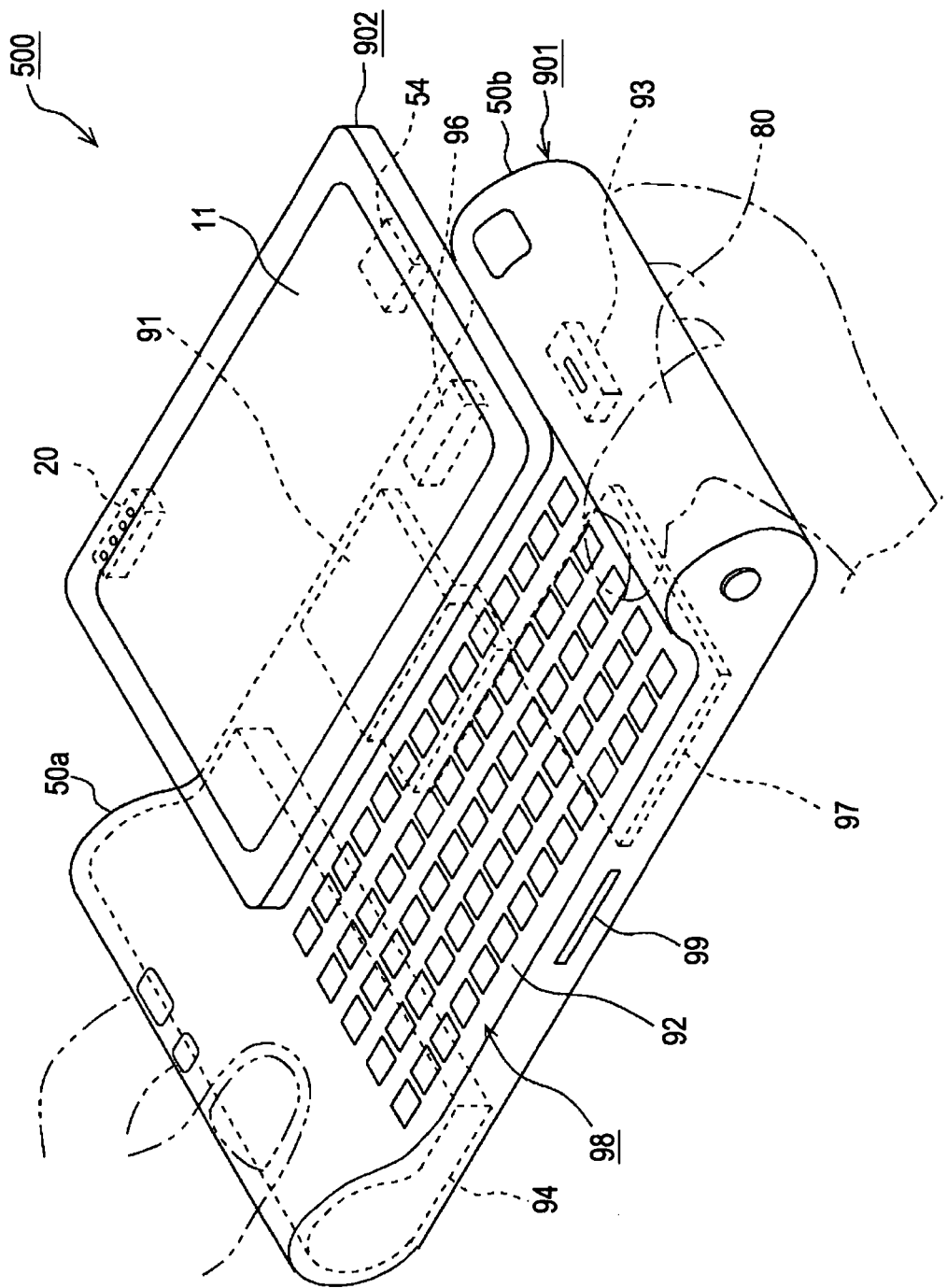
FIG. 14 is a perspective view showing an example structure of a mobile personal computer according to a fifth embodiment.
Figure 15A:
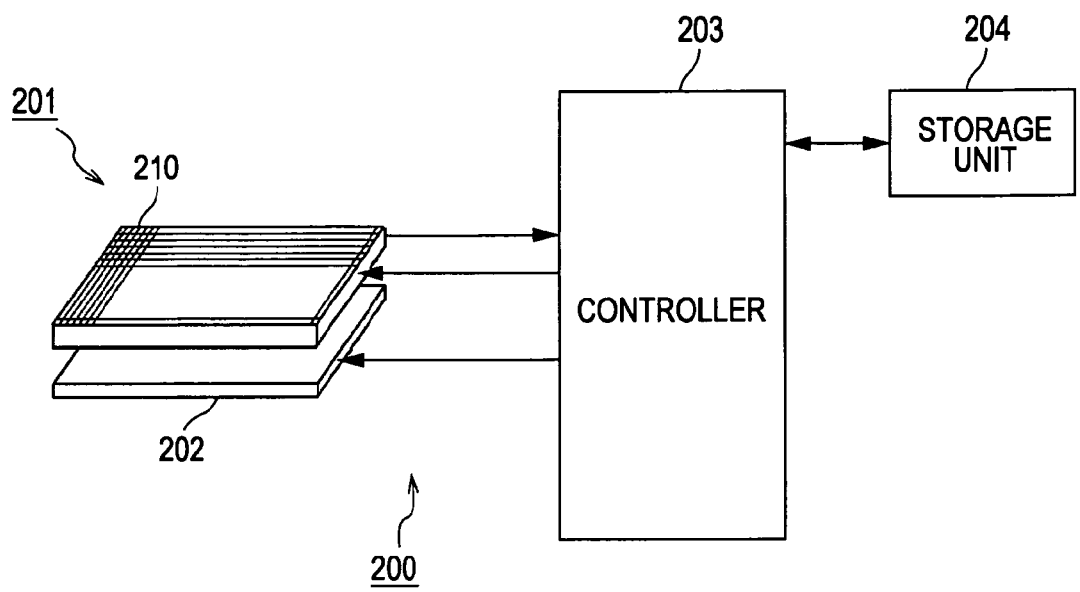
FIGS. 15A and 15B are diagrams showing an example structure of an input device of the related art.
Figure 15B:
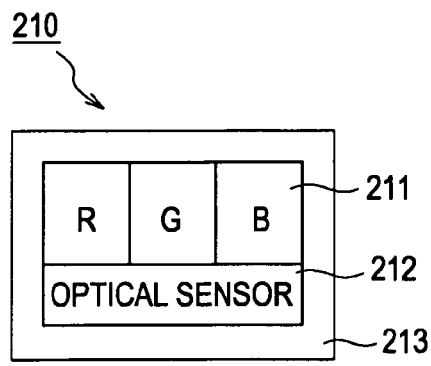
Figure 16:
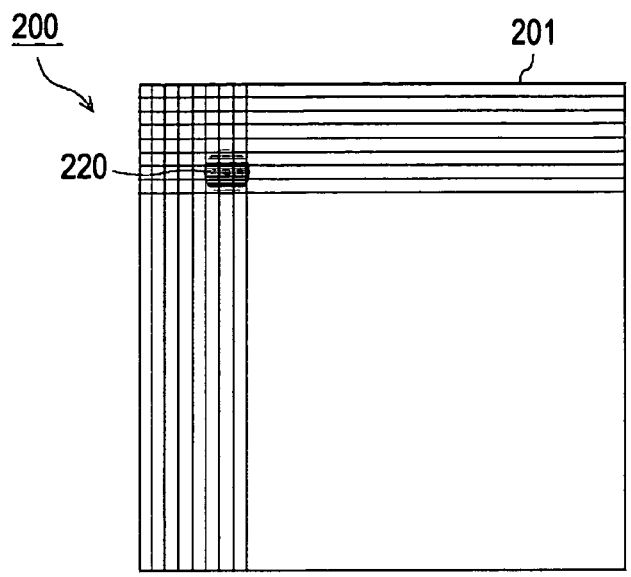
FIG. 16 is a diagram showing difference determination performed by the input device.
Figure 17:
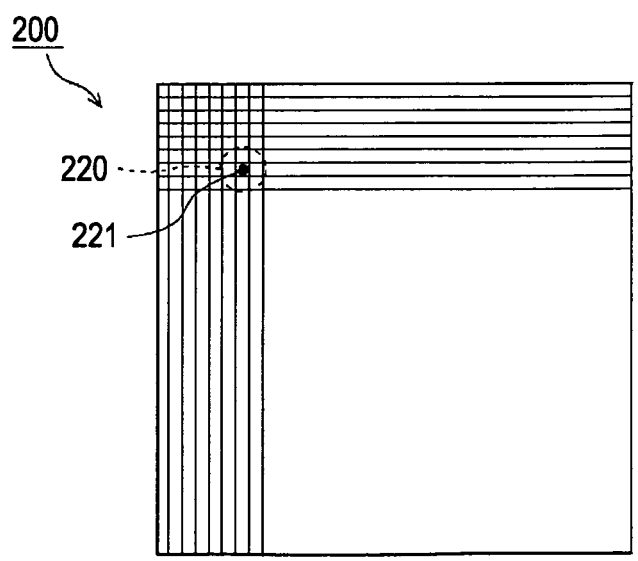
FIG. 17 is a diagram showing an example of coordinate setting performed by the input device.
Figure 18:
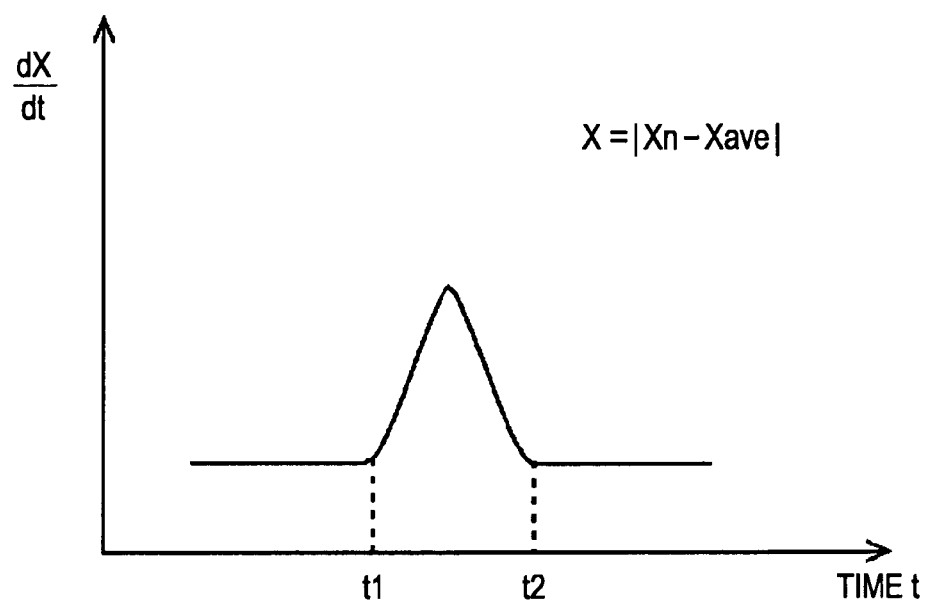
FIG. 18 is a characteristic diagram showing an example of touch determination performed by the input device.
Figure 19:
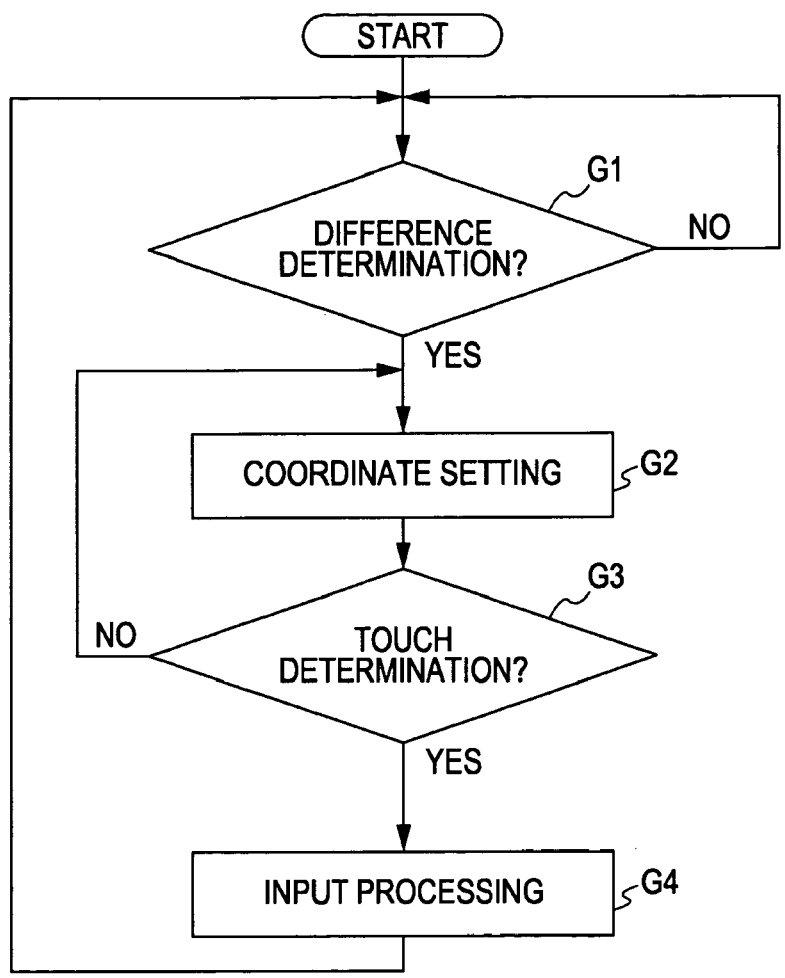
FIG. 19 is a flowchart showing an example of an input process of the input device.

FIG. 14 is a perspective view showing an example structure of a mobile personal computer (PC) 500 according to a fifth embodiment, including an input device 100 according to an embodiment. The mobile PC 500 shown in FIG. 14 may be another example of an electronic apparatus, in which a display screen is touched by an operating member (or operator) to enter information. The mobile PC 500 performs various kinds of data processing including audio and video processing. The mobile PC 500 may also capture an object image and record ambient sound. The mobile PC 500 includes the input device 100, which is described in the first embodiment. A display screen 11 and a storage unit 16 according to an embodiment are applied to the input device 100.

The mobile PC 500 includes a lower housing 901 that is shaped into a tray having left and right hand grips 50a and 50b, and an upper housing 902 slidable over a top surface of the tray. For example, the housings 901 and 902 are slidably (or rotatably) engaged with each other by a hinge mechanism 91. The hinge mechanism 91 allows slidable engagement between a sliding section (not shown) disposed at a predetermined position on an operation surface of the lower housing 901 and an engagement receiving section (not shown) disposed at an end on a back side of the upper housing 902 so that the upper housing 902 is surface-connected to the lower housing 901 with a sliding degree of freedom corresponding to a predetermined moving distance.

The lower housing 901 has an operation panel 98 provided on an upper surface thereof. The operation panel 98 includes a plurality of push button switches 92 arranged in a matrix. The push button switches 92 may include "kana" keys indicating Japanese kana characters "a" to "n", an alphabet keys indicating alphabetic characters "A" to "Z", number keys indicating numbers "0" to "9", symbol keys indicating symbols such as "*" and "#", hook buttons such as "on-hook" and "off-hook" keys, and a menu key. A connector 99 such as a USB terminal is placed on a front outer side of the lower housing 901 to allow communication with an external apparatus.

A module antenna 96 is mounted in an inside upper portion of the lower housing 901, and a loud sound speaker (not shown) is provided in an inner upper peripheral portion of the antenna 96 to output sound such as ringer melody or music attached to video data. In addition to the hinge mechanism 91, a circuit substrate 97 is also provided within the lower housing 901. A battery 94 is accommodated in the left hand grip 50a of the lower housing 901 to supply power to the circuit substrate 97, the display screen 11, and other units. A microphone 93 for telephone calls is mounted in the right hand grip 50b, and functions as a telephone mouthpiece.

The upper housing 902 slidably engaged with the lower housing 901 by the hinge mechanism 91 has a display screen 11. A camera 54 is mounted on the display screen 11, and is operated to capture an object image. A micro actuator 20 having an actuator function is provided on a surface of the upper housing 902, for example, in an upper left portion on the surface. The micro actuator 20 functions as a receiver (or earpiece) for telephone calls and an actuator for providing a tactile sensation.

An input device 100 having a tactile sensation function is disposed below a surface of the upper housing 902 where the speaker is mounting. The input device 100 has the display screen 11, and selects and executes an input mode from among a plurality of input modes according to a pressing operation of an operating member on an input detection surface of the display screen 11. On the display screen 11, input information such as a plurality of button icons is displayed. Also in the fifth embodiment, when an icon image for input operation displayed on the display screen 11 is operated with a finger 80, a desired input mode is selected according to the brightness or area of a light-shielded portion formed by the finger 80 and is executed. Furthermore, a click sound (cyber switch operation sound) is generated from the actuator 20, and a tactile sensation is given to a finger of an operator touching on the display screen 11.

Accordingly, the mobile PC 500 according to the fifth embodiment includes the optical input device 100 according to an embodiment. The controller 15 compares a detected area or brightness of a light-shielded portion formed by an operating member with a predetermined threshold value to select a desired input mode from among a plurality of input modes. Therefore, input processing can be implemented for each stage of operation (each input mode) according to a pressing state of the operating member. In this manner, the mobile PC 500 equipped with the optical input device 100 can be provided.

In the foregoing embodiments, electronic apparatuses have been described in the context of the mobile phone 1, video camera 400, and mobile PC 500 including an optical input device. However, these electronic apparatuses are illustrative, and may include an existing two-axis hinged mobile phone, a slide-opening mobile phone, a portable terminal apparatus having upper and lower housings each of which is provided with a display screen, and a digital camera.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical input device having a display screen, a portion of the display screen being shielded from light by an operating member to implement input processing based on a plurality of input modes, the input device comprising:
   input detection means including a display unit configured to display predetermined input information, the input detection means detecting at least one of an area and brightness of a light- shielded portion formed on the display screen by the operating member by approaching the display unit; and
   control means for providing display control of the display unit and input control on the basis of the at least one of an area and brightness detected by the input detection means,
   wherein the control means compares the detected at least one of an area and brightness with a predetermined threshold value to select a desired input mode from among the plurality of input modes, and
   wherein the control means defines a detection area corresponding to a same piece of input information displayed on the input detection means for each of the plurality of input modes, and at least one of a size and a shape of the detection areas corresponding to the same piece of input information is different for each of the input modes, and
   wherein the same piece of input information displayed on the input detection means is an icon, and the control means defines a first detection area corresponding to and overlapping the icon in a first input mode as an edge portion of the icon, and defines a second detection area corresponding to and overlapping the icon in a second input mode as a center portion of the icon,
   wherein the input detection means displays adjacent icons, each of the adjacent icons having an edge portion of a respective icon as a detection area in the first input mode and having a center portion of the respective icon as a detection area in the second input mode,
   wherein a space between detection areas of the adjacent icons is larger in the second input mode than in the first input mode.

2. The input device according to claim 1, wherein the control means executes input processing in the desired input mode on the basis of at least one of a detected position and movement of the light-shielded portion within the detection area.

3. The input device according to claim 1, further comprising vibration means connected to the control means, the vibration means vibrating the display screen on the basis of a vibration pattern corresponding to the desired input mode.

4. A storage medium storing a program adapted to implement input processing based on a plurality of input modes according to a light-shielding operation performed, using an operating member, on predetermined input information displayed on a display screen, the program comprising the steps of:
   detecting by an input detection means at least one of an area and brightness of a light-shielded portion formed on the display screen by the operating member by approaching the display screen;
   comparing the detected at least one of an area and brightness with a predetermined threshold value to select a desired input mode from among the plurality of input modes;
   defining a detection area corresponding to a same piece of input information displayed on the display screen for each of the plurality of input modes, and at least one of a size and a shape of the detection areas corresponding to the same piece of input information is different for each of the input modes, wherein the same piece of input information displayed on the display screen is an icon, and a first detection area corresponding to and overlapping the icon in a first input mode is defined as an edge portion of the icon, and a second detection area corresponding to and overlapping the icon in a second input mode is defined as a center portion of the icon;
   detecting at least one of a position and movement of the light-shielded portion within the detection area for the desired input mode; and
   determining input processing in the desired input mode on the basis of the detected at least one of a position and movement,
   wherein an adjacent icons displays by the input detection means, each of the adjacent icons having an edge portion of a respective icon as a detection area in the first input mode and having a center portion of the respective icon as a detection area in the second input mode,
   wherein a space between detection areas of the adjacent icons is larger in the second input mode than in the first input mode.

5. An information input method for implementing input processing based on a plurality of input modes according to a light-shielding operation performed, using an operating member, on predetermined input information displayed on a display screen, the information input method comprising the steps of:
   detecting by an input detection means at least one of an area and brightness of a light-shielded portion formed on the display screen by the operating member by approaching the display screen;
   comparing the detected at least one of an area and brightness with a predetermined threshold value to select a desired input mode from among the plurality of input modes;

defining a detection area corresponding to a same piece of input information displayed on the display screen for each of the plurality of input modes, and at least one of a size and a shape of the detection areas corresponding to the same piece of input information is different for each of the input modes, wherein the same piece of input information displayed on the display screen is an icon, and a first detection area corresponding to and overlapping the icon in a first input mode is defined as an edge portion of the icon, and a second detection area corresponding to and overlapping the icon in a second input mode is defined as a center portion of the icon;

detecting at least one of a position and movement of the light-shielded portion within the detection area for the desired input mode; and determining input processing in the desired input mode on the basis of the detected at least one of a position and movement, wherein an adjacent icons displays by the input detection means, each of the adjacent icons having an edge portion of a respective icon as a detection area in the first input mode and having a center portion of the respective icon as a detection area in the second input mode, wherein a space between detection areas of the adjacent icons is larger in the second input mode than in the first input mode.

6. The information input method according to claim 5, wherein the step of defining a detection area includes defining a detection area in an edge portion of a portion where the input information is displayed on the display screen.

7. The information input method according to claim 5, wherein the step of defining a detection area includes defining a detection area in a center portion of a portion where the input information is displayed on the display screen.

8. An electronic apparatus comprising: an optical input device having a display screen, a portion of the display screen being shielded from light by an operating member to implement input processing based on a plurality of input modes, the input device including input detection means including a display unit configured to display predetermined input information, the input detection means detecting at least one of an area and brightness of a light- shielded portion formed on the display screen by the operating member by approaching the display unit, and control means for providing display control of the display unit and input control on the basis of the at least one of an area and brightness detected by the input detection means, wherein the control means compares the detected at least one of an area and brightness with a predetermined threshold value to select a desired input mode from among the plurality of input modes, wherein the control means defines a detection area corresponding to a same piece of input information displayed on the display screen for each of the plurality of input modes, and at least one of a size and a shape of the detection areas corresponding to the same piece of input information is different for each of the input modes, and wherein the same piece of input information displayed on the display screen is an icon, and the control means defines a first detection area corresponding to and overlapping the icon in a first input mode as an edge portion of the icon, and defines a second detection area corresponding to and overlapping the icon in a second input mode as a center portion of the icon, wherein the input detection means displays adjacent icons, each of the adjacent icons having an edge portion of a respective icon as a detection area in the first input mode and having a center portion of the respective icon as a detection area in the second input mode, wherein a space between detection areas of the adjacent icons is larger in the second input mode than in the first input mode.

9. An optical input device having a display screen, a portion of the display screen being shielded from light by an operating member to implement input processing based on a plurality of input modes, the input device comprising:

an input detection unit including a display unit configured to display predetermined input information, the input detection unit being configured to detect at least one of an area and brightness of a light-shielded portion formed on the display screen by the operating member by approaching the display unit; and a control unit configured to provide display control of the display unit and input control on the basis of the at least one of an area and brightness detected by the input detection unit, wherein the control unit compares the detected at least one of an area and brightness with a predetermined threshold value to select a desired input mode from among the plurality of input modes, wherein the control unit defines a detection area corresponding to a same piece of input information displayed on the display screen for each of the plurality of input modes, and at least one of a size and a shape of the detection areas corresponding to the same piece of input information is different for each of the input modes, wherein the same piece of input information displayed on the display screen is an icon, and the control unit defines a first detection area corresponding to and overlapping the icon in a first input mode as an edge portion of the icon, and defines a second detection area corresponding to and overlapping the icon in a second input mode as a center portion of the icon, wherein the input detection unit displays adjacent icons, each of the adjacent icons having an edge portion of a respective icon as a detection area in the first input mode and having a center portion of the respective icon as a detection area in the second input mode, wherein a space between detection areas of the adjacent icons is larger in the second input mode than in the first input mode.

10. An electronic apparatus comprising:

an optical input device having a display screen, a portion of the display screen being shielded from light by an operating member to implement input processing based on a plurality of input modes, the input device including an input detection unit including a display unit configured to display predetermined input information, the input detection unit being configured to detect at least one of an area and brightness of a light-shielded portion formed on the display screen by the operating member by approaching the display unit, and a control unit configured to provide display control of the display unit and input control on the basis of the at least one of an area and brightness detected by the input detection unit, wherein the control unit compares the detected at least one of an area and brightness with a predetermined threshold value to select a desired input mode from among the plurality of input modes, wherein the control unit defines a detection area corresponding to a same piece of input information displayed on the display screen for each of the plurality of input modes, and at least one of a size and a shape of the detection areas corresponding to the same piece of input information is different for each of the input modes, and wherein the same piece of input information displayed on the display screen is an icon, and the control unit defines a first detection area corresponding to and overlapping the icon in a first input mode as an edge portion of the icon, and defines a second detection area corresponding to and overlapping the icon in a second input mode as a center portion of the icon, wherein the input detection unit displays adjacent icons, each of the adjacent icons having an edge portion of a respective icon as a detection area in the first input mode and having a center portion of the respective icon as a detection area in the second input mode, wherein a space between detection areas of the adjacent icons is larger in the second input mode than in the first input mode.

11. The input device according to claim 1, wherein at least one of a shape and a size of a first detection area corresponding to a first input mode is different than at least one of a shape and a size of a second detection area corresponding to a second input mode.

* * * * *